United States Patent
Koo et al.

(10) Patent No.: US 11,153,560 B2
(45) Date of Patent: Oct. 19, 2021

(54) METHOD AND APPARATUS FOR PERFORMING NON-SEPARABLE TRANSFORM BASED ON MODIFIED INTRA PREDICTION MODE

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/168,571

(22) Filed: Feb. 5, 2021

(65) Prior Publication Data
US 2021/0160490 A1   May 27, 2021

Related U.S. Application Data

(63) Continuation of application No. PCT/KR2019/010231, filed on Aug. 12, 2019.
(Continued)

(51) Int. Cl.
*H04N 19/11* (2014.01)
*H04N 19/176* (2014.01)
*H04N 19/61* (2014.01)

(52) U.S. Cl.
CPC .......... *H04N 19/11* (2014.11); *H04N 19/176* (2014.11); *H04N 19/61* (2014.11)

(58) Field of Classification Search
CPC ....... H04N 19/11; H04N 19/176; H04N 19/61
See application file for complete search history.

(56) References Cited

U.S. PATENT DOCUMENTS 10,284,866 B1 *   5/2019   Zhao ............... H04N 19/11
10,911,766 B2 *   2/2021   Zhao ............... H04N 19/11
(Continued)

FOREIGN PATENT DOCUMENTS

JP      2016-171586 A      9/2016
KR   10-2018-0085526 A   7/2018
(Continued)

OTHER PUBLICATIONS

Akula, Sri Nitchith et al. Description of SDR, HDR and 360° video coding technology proposal considering mobile application scenario by Samsung, Huawei, GoPro, and HiSilicon. JVET-J0024. Joint Video Experts Team (JVET) of ITU-T SG 16 WP 3 and ISO/IEC JTC 1/SC 29/WG 11. 10th Meeting: San Diego, CA. Apr. 11, 2018, pp. 1-115 See pp. 51-52, 55-57.
(Continued)

*Primary Examiner* — Jessica M Prince
(74) *Attorney, Agent, or Firm* — Dentons US LLP

(57) ABSTRACT

Embodiments of the present invention provide a method and apparatus for processing a video signal. A method for decoding an image signal according to an embodiment of the present invention comprises the steps of: for a current block having a width and a height different from each other, determining a modified intra prediction mode from an intra prediction mode, on the basis of a ratio between the width and the height of the current block and the intra prediction mode; determining an inverse non-separable transform set on the basis of the modified intra prediction mode; and applying an inverse non-separable transform matrix selected from the inverse non-separable transform set with respect to the top-left region of the current block, which is determined according to the width and the height of the current block.

7 Claims, 38 Drawing Sheets

Related U.S. Application Data

(60) Provisional application No. 62/717,890, filed on Aug. 12, 2018.

(56) References Cited

U.S. PATENT DOCUMENTS

| | | | |
|---|---|---|---|
| 2018/0098064 A1* | 4/2018 | Seregin | H04N 19/463 |
| 2019/0356909 A1* | 11/2019 | Lainema | H04N 19/147 |
| 2019/0387241 A1* | 12/2019 | Kim | H04N 19/44 |
| 2020/0021817 A1* | 1/2020 | Van der Auwera | H04N 19/96 |

FOREIGN PATENT DOCUMENTS

| | | |
|---|---|---|
| WO | WO17/138791 A | 8/2017 |
| WO | WO17/171370 A | 10/2017 |
| WO | WO18/117892 A1 | 6/2018 |

OTHER PUBLICATIONS

Moonmo Koo et al., "E6-related: NSST modification for wide angle intra prediction", Joint Video Experts Team (JVET) of ITU-T SG 16 WP 3 and ISO/IEC JTC 1/SC 29/WG 11, Oct. 3-12, 2018, JVET-L0153, XP030191224.

Jianle Chen et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, Jul. 10-18, 2018, JVET-K1002-v1, XP030193537.

Kiho Choi et al., "CE6: NSST with modified NSST sets and signaling (Test2.3)", Joint Video Experts Team (JVET) of ITU-T SG 16 WP 3 and ISO/IEC JTC 1/SC 29WG 11, Jul. 10-18, 2018, JVET-K0174-v1, XP030198993.

Fabien Racape et al., "CE3-related: Wide-angle intra prediction for non-square blocks", Joint Video Experts Team (JVET) of ITU-T SG 16 WP 3 and ISO/IEC JTC 1/SC 29/WG 11, Jul. 10-18, 2018, JVET-K0500_r4, XP030199964.

Qualcomm, "Mode-dependent non-separable secondary transform", International Telecommunication Union, Telecommunication Standardization Sector Study Period 2013-2016, COM 16-1044-E, Sep. 30, 2015, pp. 1-5, XP044149681.

* cited by examiner

[FIG. 1]
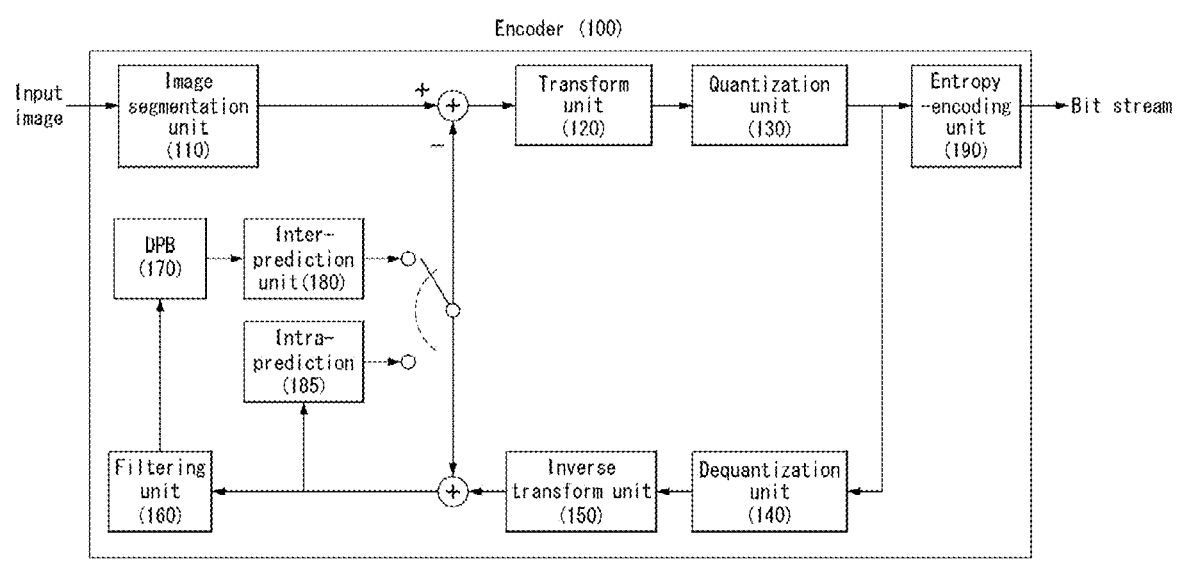

[FIG. 2]
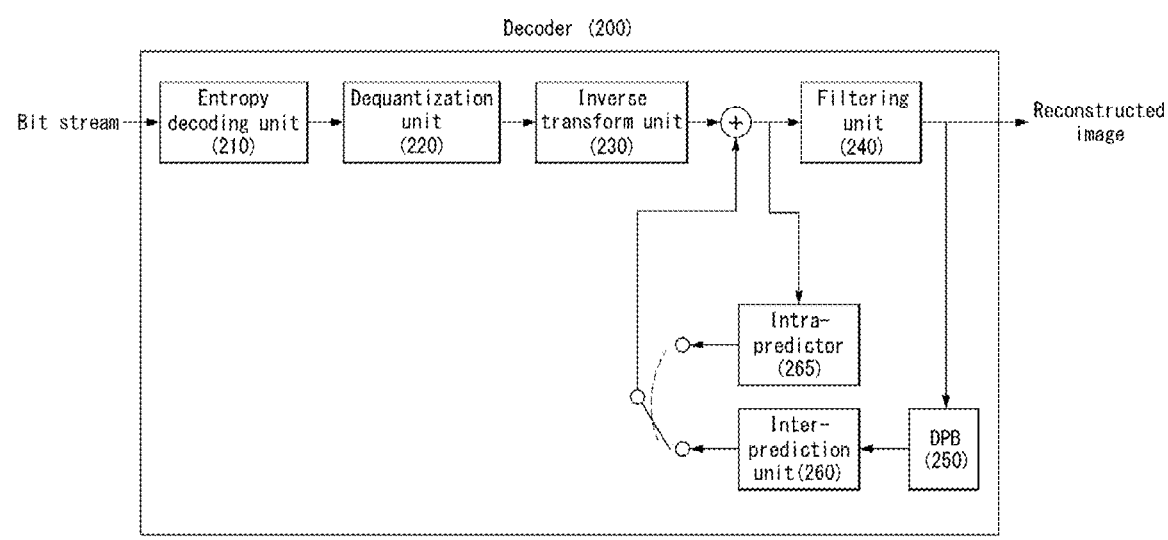

[FIG. 3a]
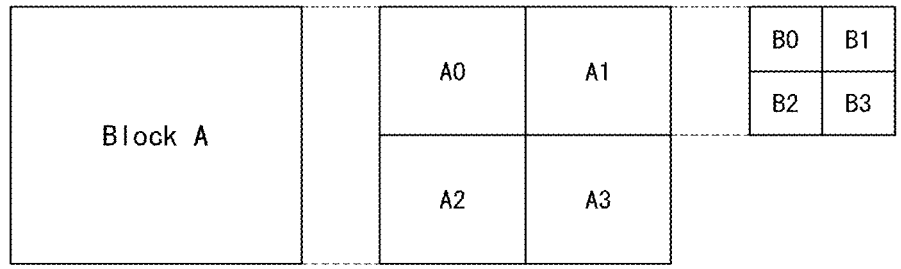
[FIG. 3b]
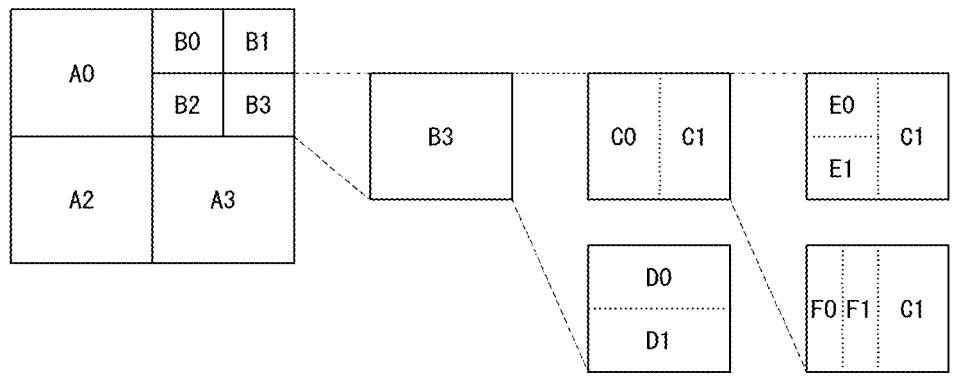
[FIG. 3c]
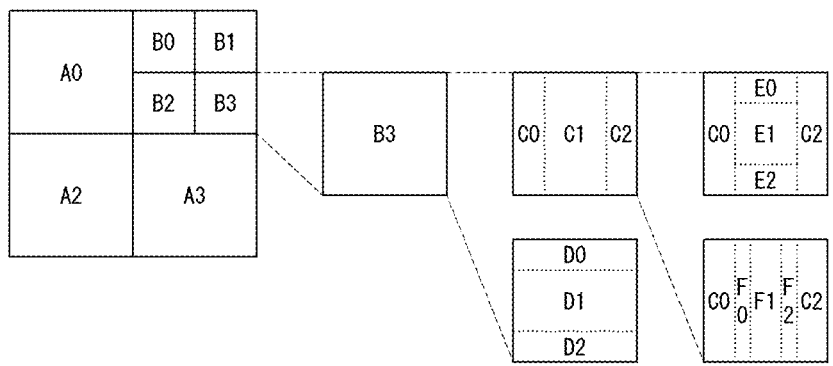

[FIG. 3d]
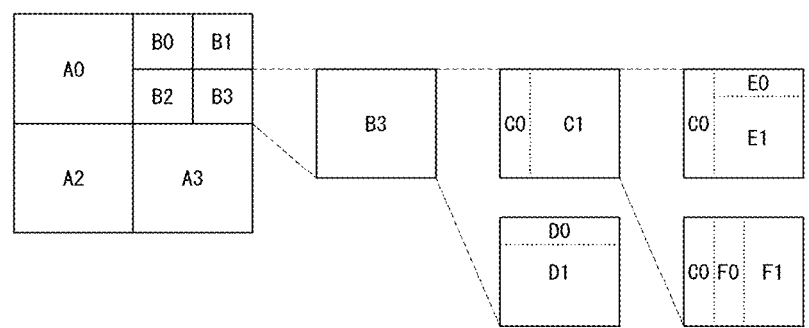

[FIG. 4]
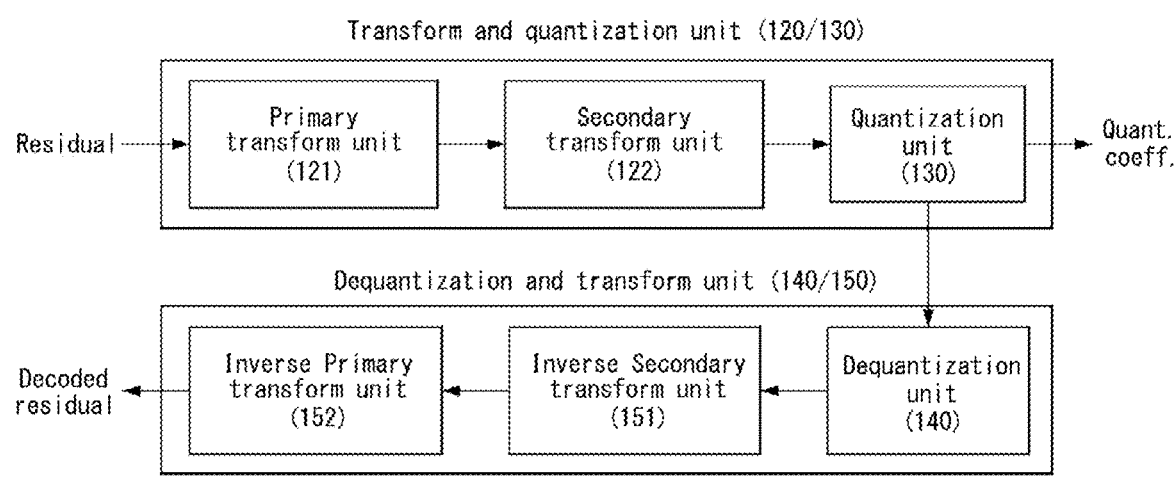

[FIG. 5]
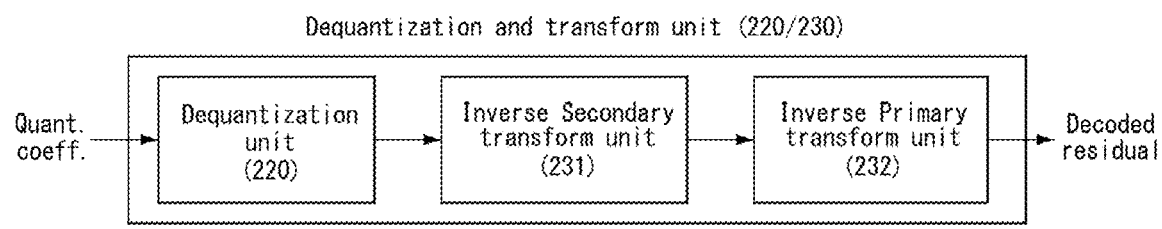

[FIG. 6a]

| Set | Idx. | Hor. | Ver. | Intra pred. mode |
|---|---|---|---|---|
| Set 0 | 0 | DST-7 | DST-7 | 0 |
| | 1 | DCT-5 | DST-7 | |
| | 2 | DST-7 | DCT-5 | |
| | 3 | DCT-5 | DCT-5 | |
| Set 1 | 0 | DST-7 | DST-7 | 1, 3, 5, 7, 9, 11, 13, 23, 25, 27, 29, 31, 33, 35, 37, 39, 41, 43, 45, 55, 57, 59, 61, 63, 65 |
| | 1 | DST-1 | DST-7 | |
| | 2 | DST-7 | DST-1 | |
| | 3 | DST-1 | DST-1 | |
| Set 2 | 0 | DST-7 | DST-7 | 2, 4, 6, 8, 10, 12, 24, 26, 28, 30, 32, 34, 36, 38, 40, 42, 44, 56, 58, 60, 64, 66 |
| | 1 | DCT-8 | DST-7 | |
| | 2 | DST-7 | DCT-8 | |
| | 3 | DCT-8 | DCT-8 | |
| Set 3 | 0 | DST-7 | DST-7 | 14, 15, 16, 17, 18, 19, 20, 21, 22 (Neighboring angles to horizontal directions) |
| | 1 | DCT-5 | DST-7 | |
| | 2 | DST-7 | DCT-8 | |
| | 3 | DCT-5 | DCT-8 | |
| Set 4 | 0 | DST-7 | DST-7 | 46, 47, 48, 49, 50, 51, 52, 53, 54 (Neighboring angles to vertical directions) |
| | 1 | DCT-8 | DST-7 | |
| | 2 | DST-7 | DCT-5 | |
| | 3 | DCT-8 | DCT-5 | |

[FIG. 6b]

| | Idx | Hor. | Ver. |
|---|---|---|---|
| MTS_CU_Flag = 0 | N/A | DCT-2 | DCT-2 |
| MTS_CU_Flag = 1 | 0 | DCT-8 | DCT-8 |
| | 1 | DST-7 | DCT-8 |
| | 2 | DCT-8 | DST-7 |
| | 3 | DST-7 | DST-7 |

[FIG. 7]
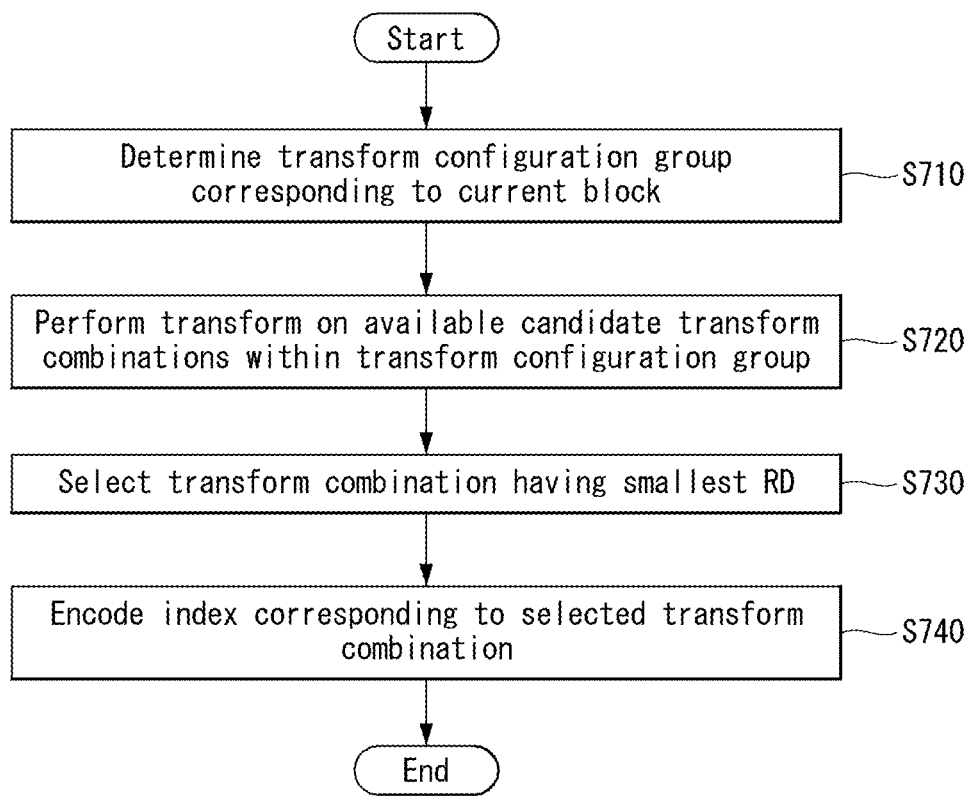

[FIG. 8]
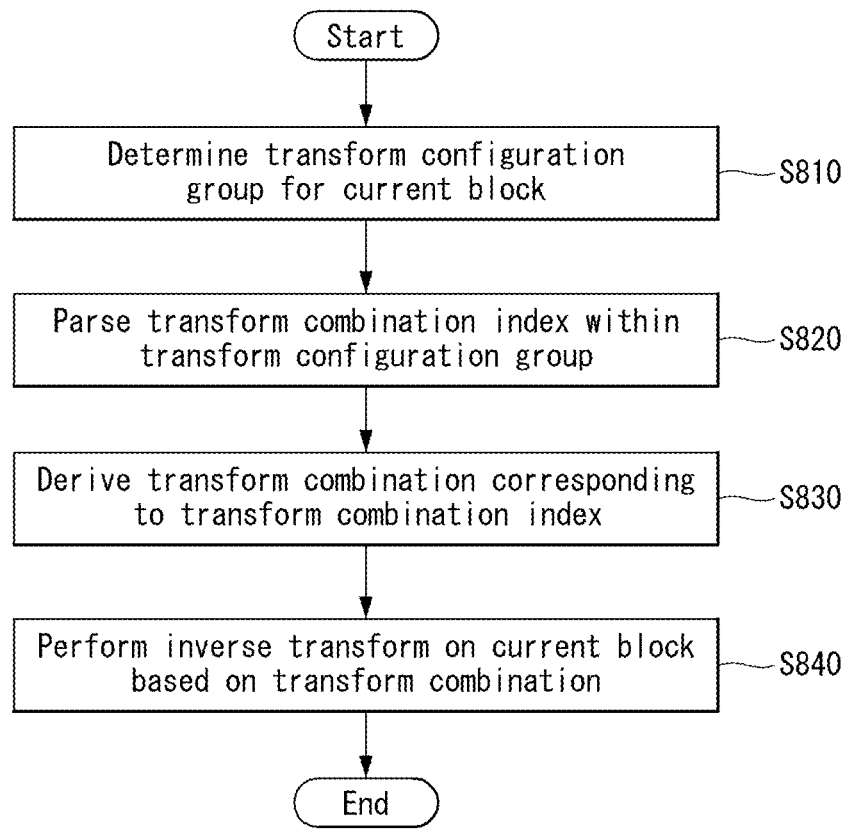

[FIG. 9]
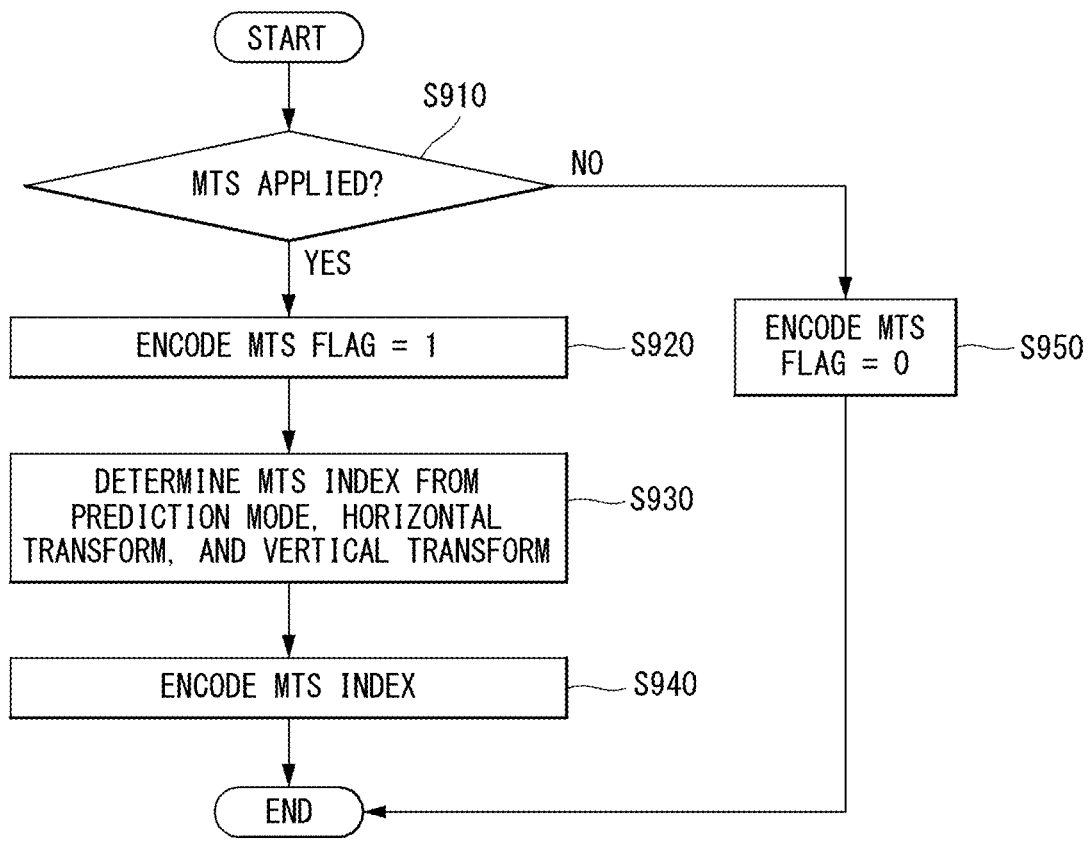

[FIG. 10]
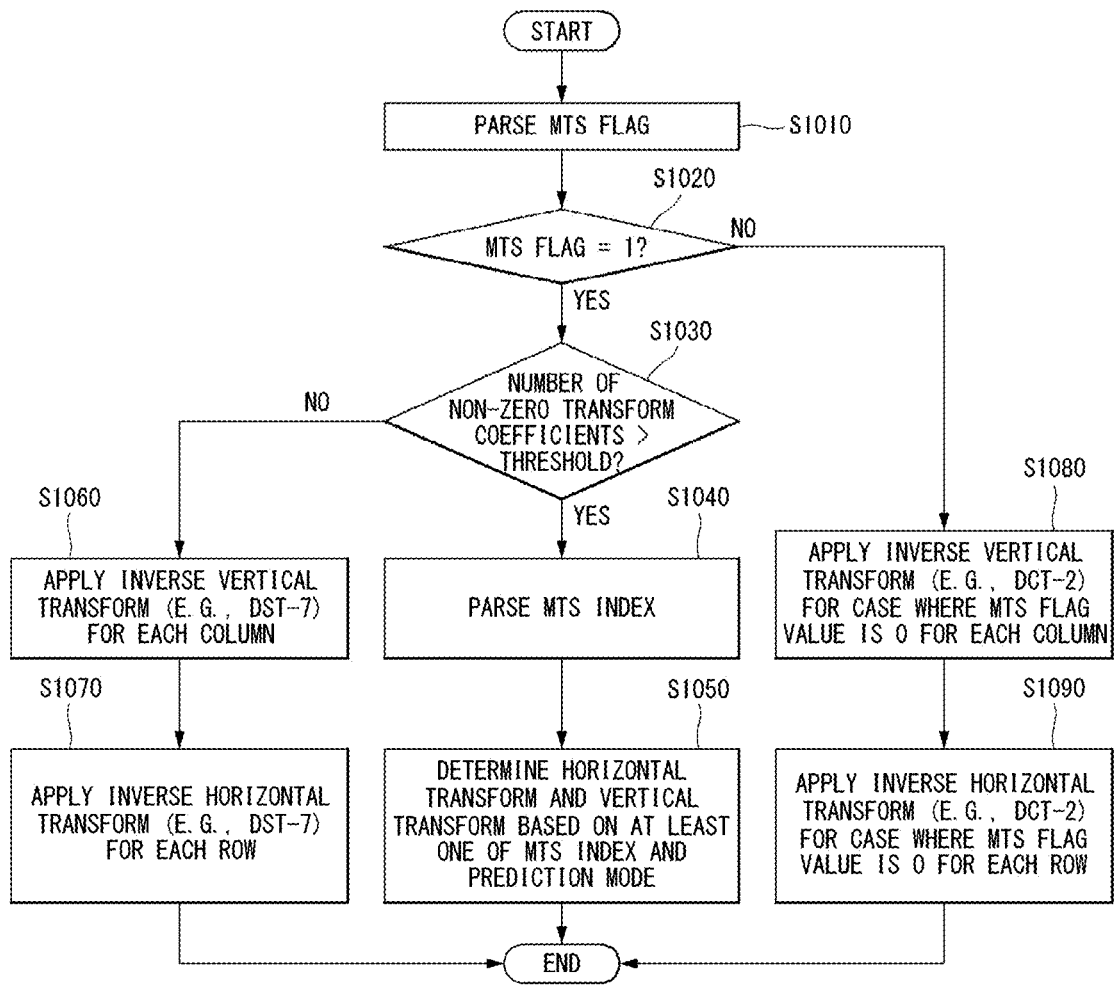

[FIG. 11]
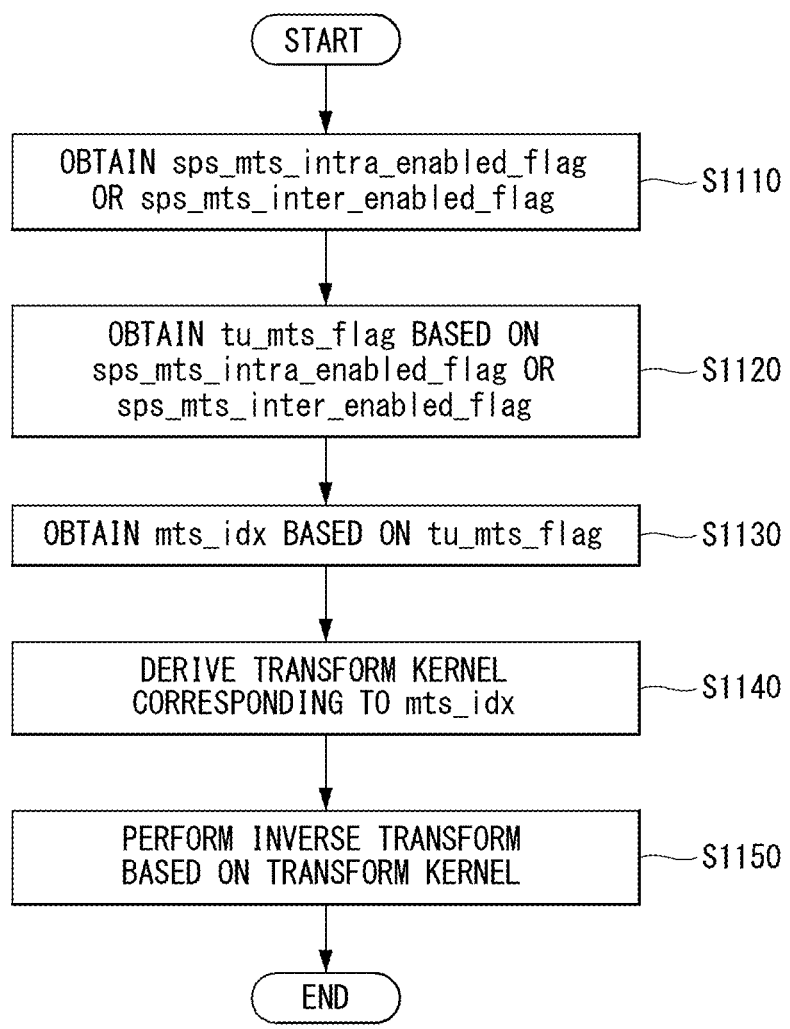

[FIG. 12]

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

[FIG. 13]
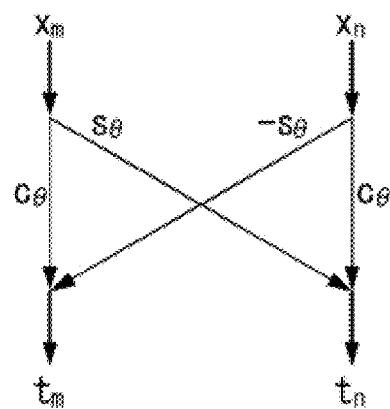

[FIG. 14]
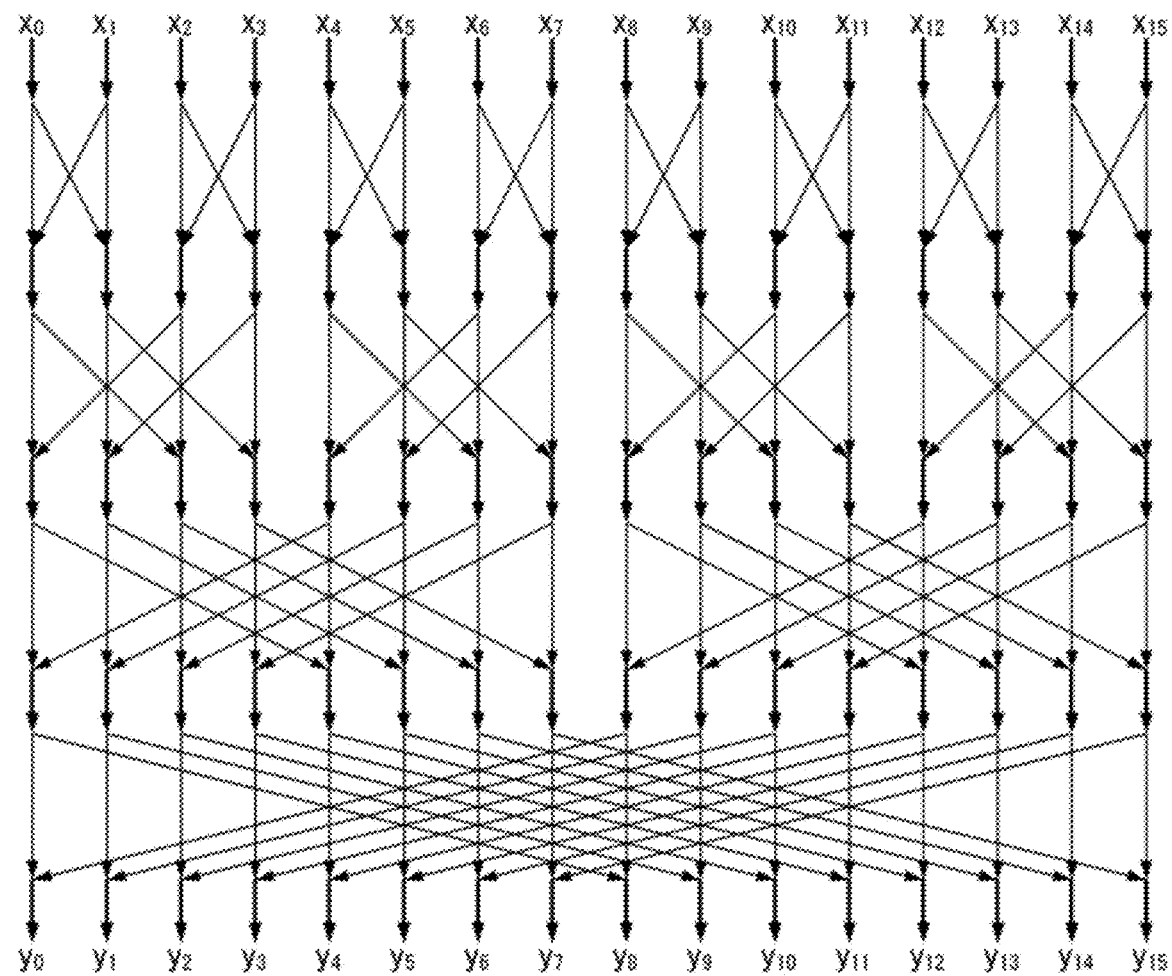

[FIG. 15]
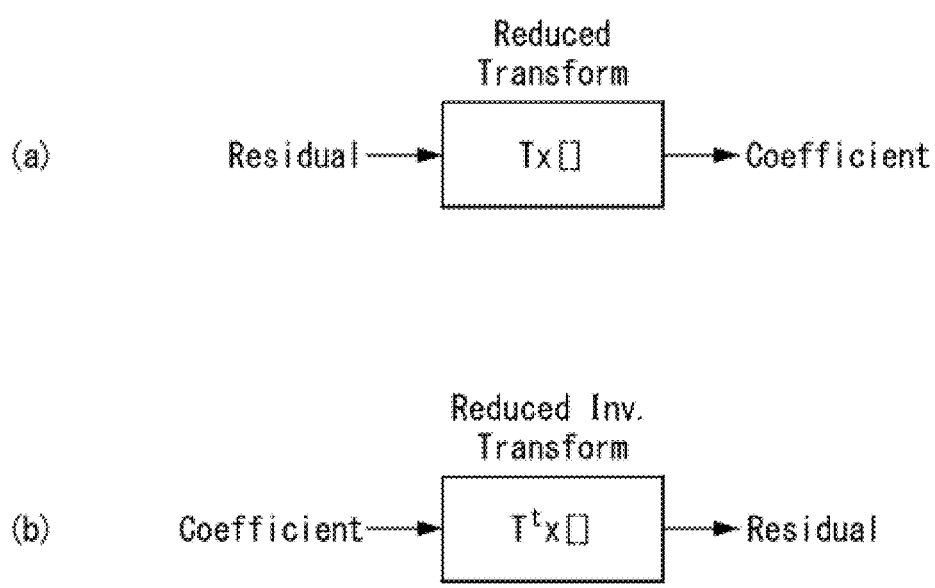

[FIG. 16]
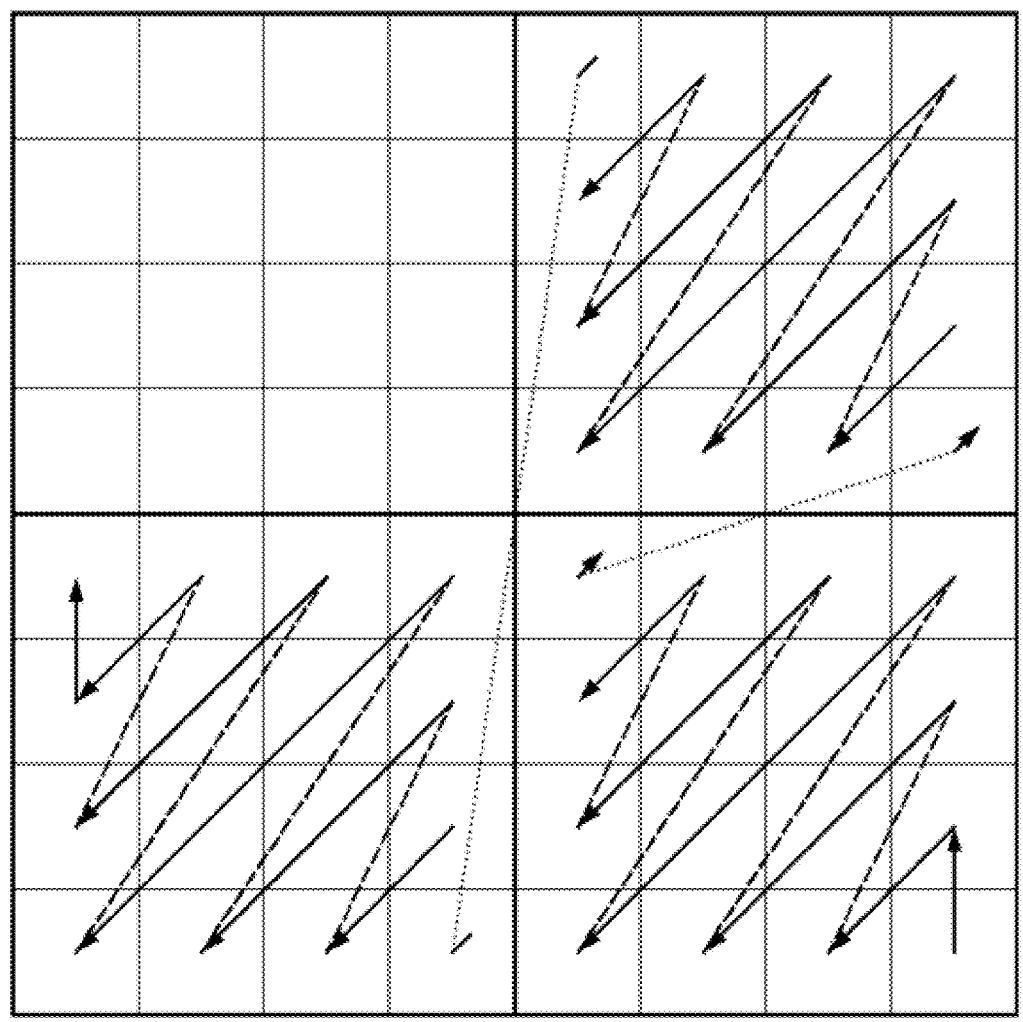

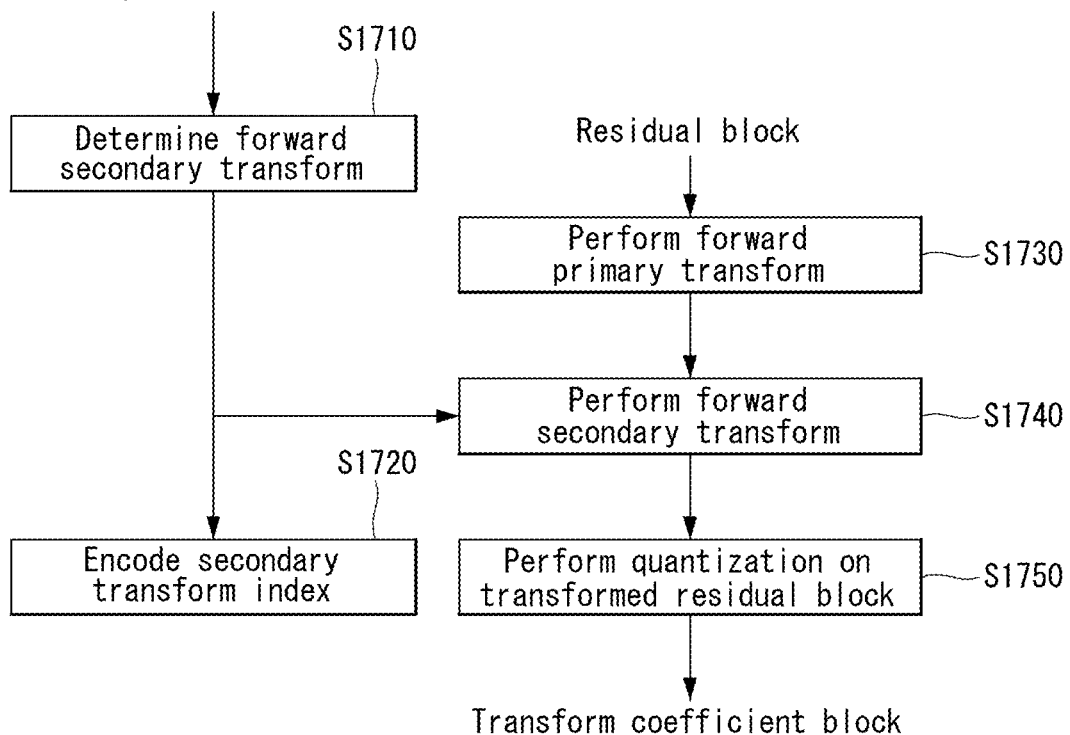

[FIG. 18]
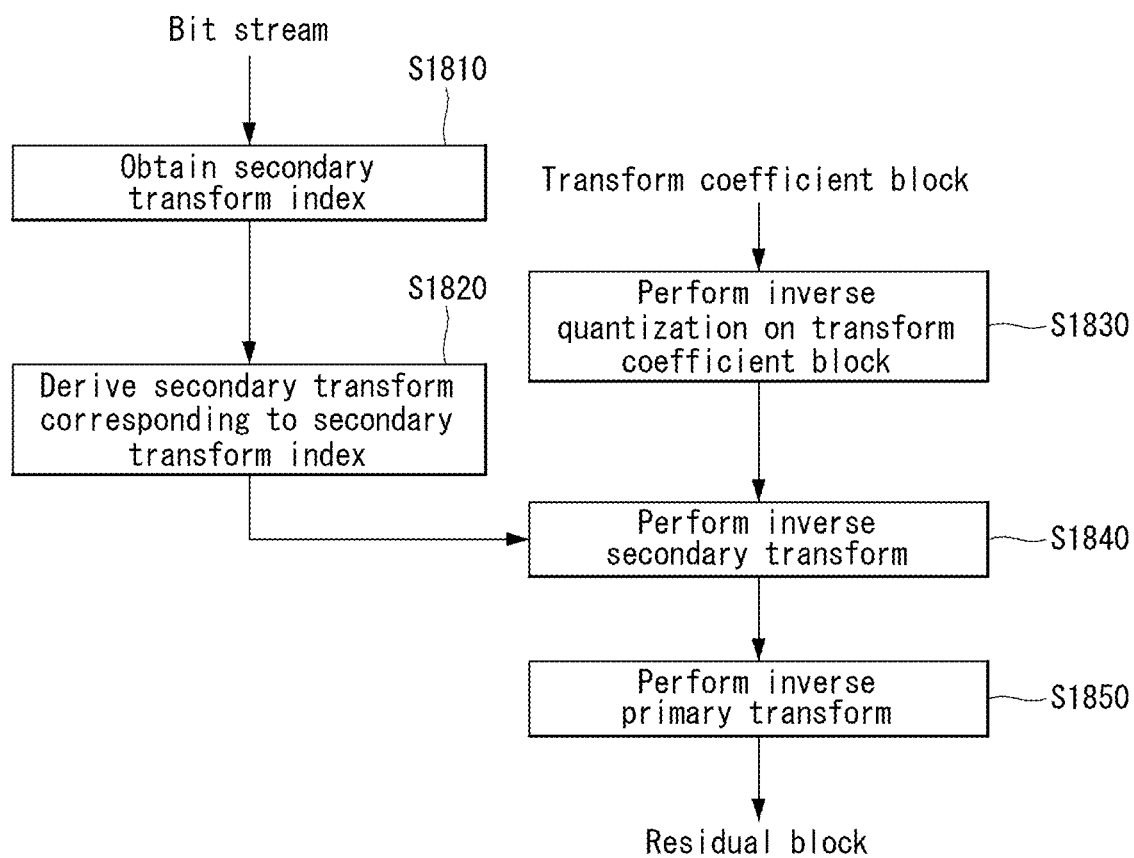

[FIG. 19]
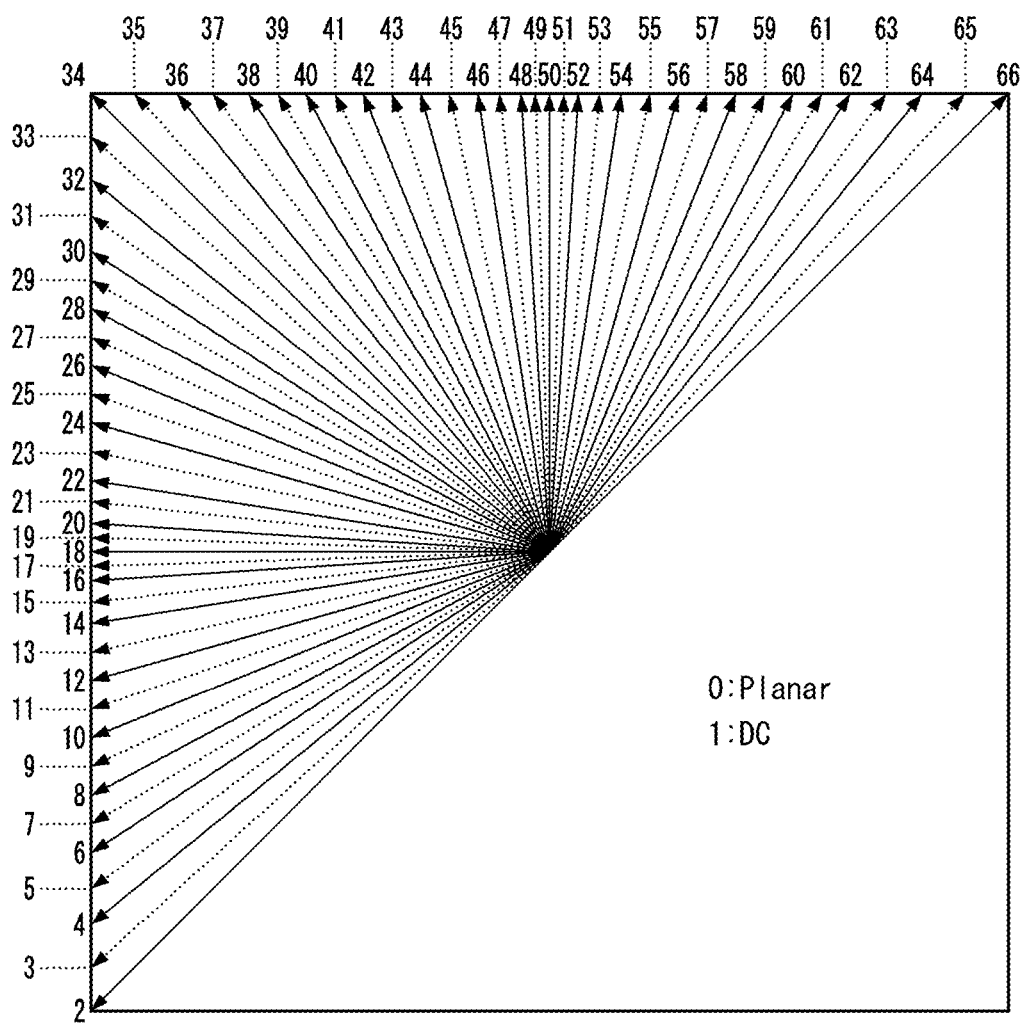

[FIG. 20]

| 35mode index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|---|---|---|---|---|---|
| 67mode index | 0 | 1 | 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 | 50 | 52 | 54 | 56 | 58 | 60 | 62 | 64 | 66 |

[FIG. 21]
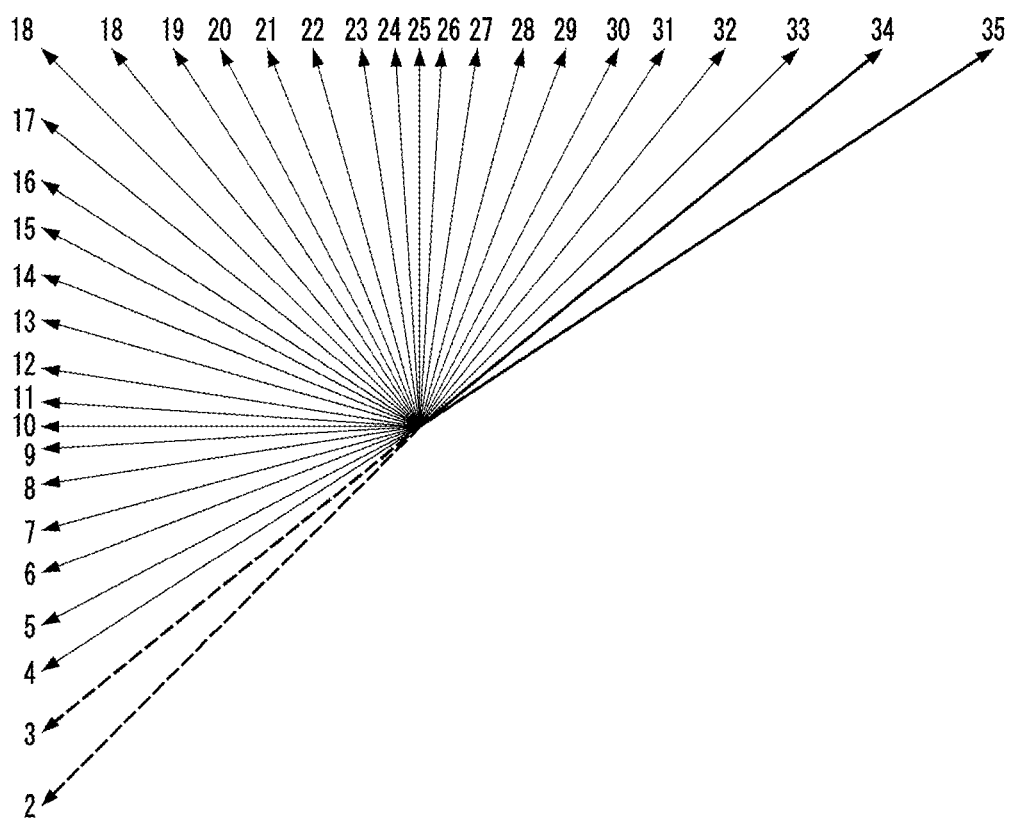

[FIG. 22]
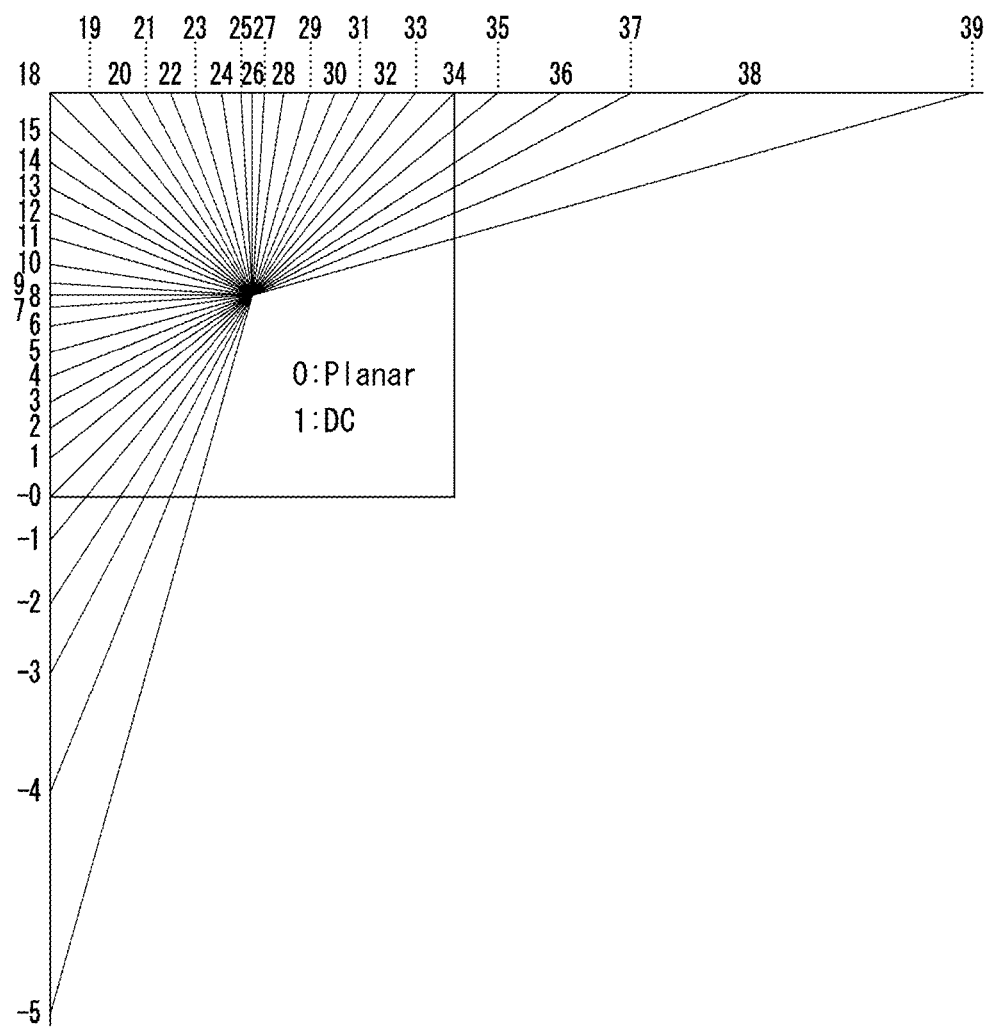

[FIG. 23]

| 35 mode index | −5  | −4 | −3 | −2 | −1 | 35 | 36 | 37 | 38 | 39 |
|---|---|---|---|---|---|---|---|---|---|---|
| 67 mode index | −10 | −8 | −6 | −4 | −2 | 68 | 70 | 72 | 74 | 76 |

[FIG. 24]
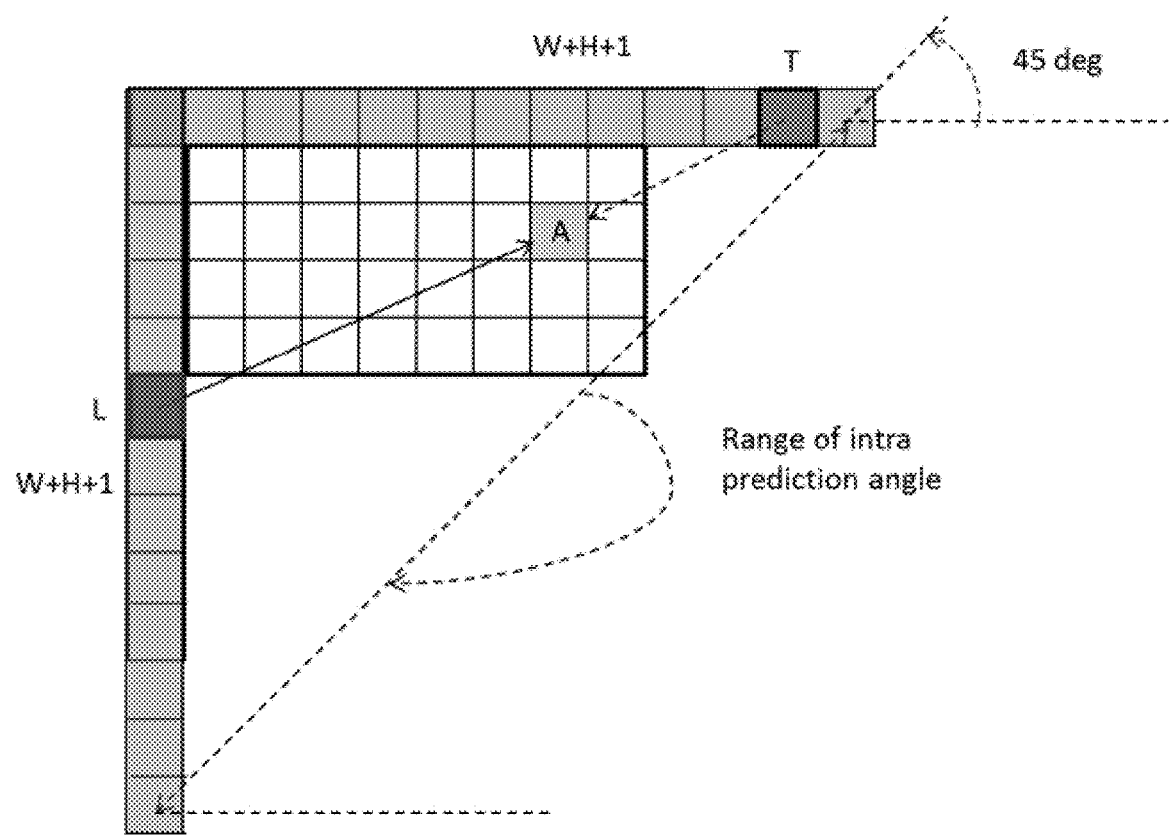

[FIG. 25]
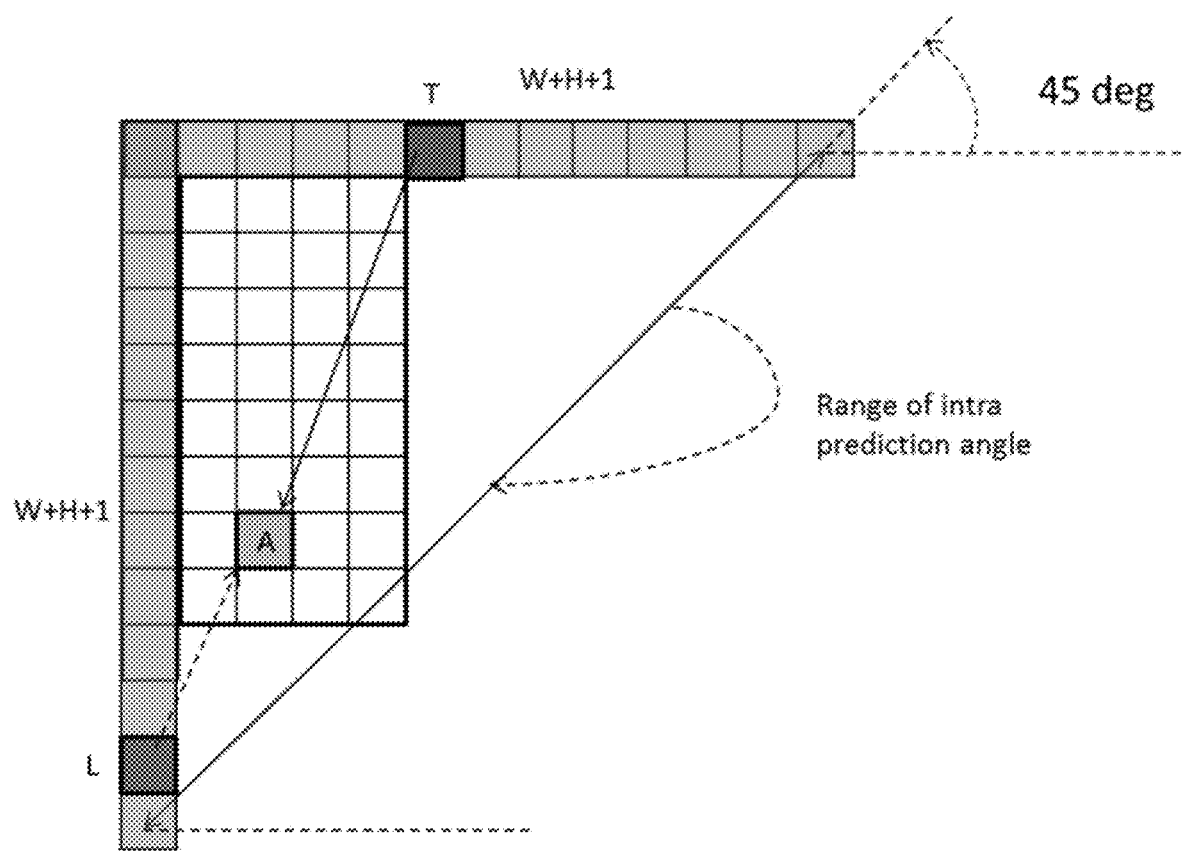

[FIG. 26a]
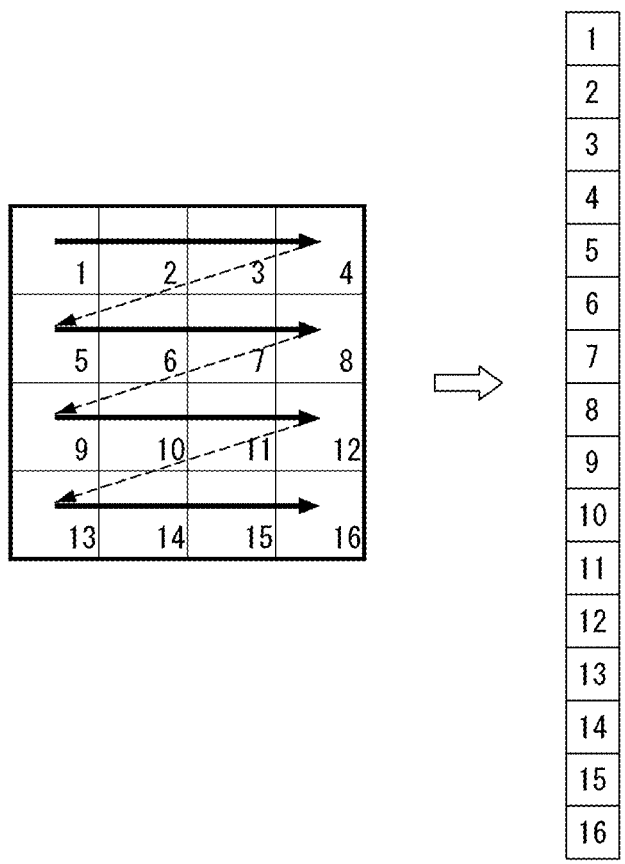

[FIG. 26b]
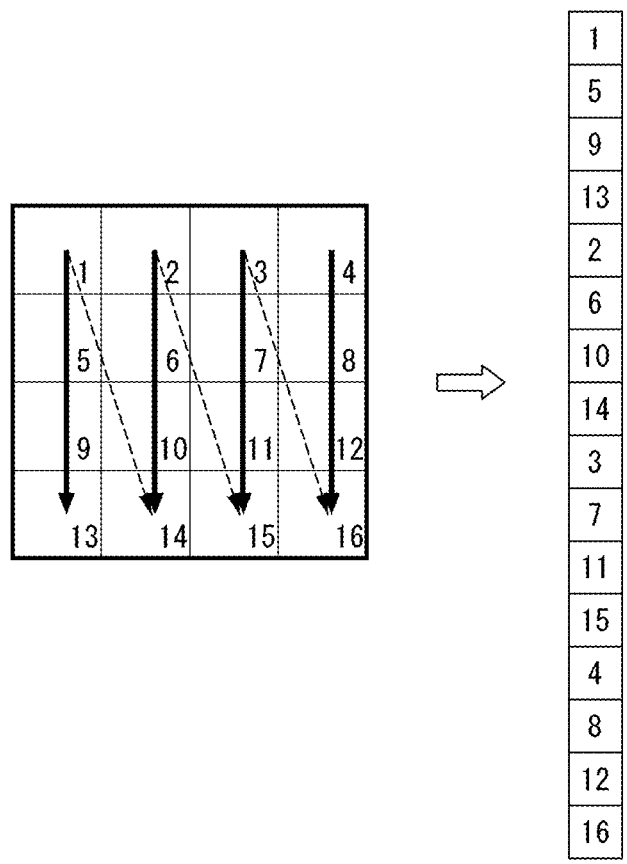

【FIG. 27a】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 44 | 43 | 42 | 41 | 40 | 39 | 38 | 37 | 36 | 35 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 35 | 36 | 37 | 38 | 39 | 40 | 41 | 42 | 43 | 44 | |

【FIG. 27b】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 2 | 2 | 2 | 2 | 2 | 2 | 2 | 2 | 2 | 2 | |

【FIG. 27c】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 35 | 35 | 35 | 35 | 35 | 35 | 35 | 35 | 35 | 35 | |

【FIG. 28a】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 0 | 2 | 2 | 2 | 6 | 6 | 6 | 10 | 10 | 10 | 10 | 10 | 14 | 14 | 14 | 18 | 18 | 18 | 18 | 18 | 22 | 22 | 22 | 26 | 26 | 26 | 26 | 26 | 30 | 30 | 30 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 30 | 30 | 30 | 26 | 26 | 26 | 26 | 26 | 22 | 22 | 22 | 18 | 18 | 18 | 18 | 18 | 14 | 14 | 14 | 10 | 10 | 10 | 10 | 10 | 6 | 6 | 6 | 2 | 2 | 2 | 2 | 2 | 2 | 2 | 2 | 2 | 2 | 2 | 2 | 2 | |

【FIG. 28b】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 6 | 6 | 6 | 10 | 10 | 10 | 10 | 10 | 14 | 14 | 14 | 18 | 18 | 18 | 18 | 18 | 22 | 22 | 22 | 26 | 26 | 26 | 26 | 26 | 30 | 30 | 30 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 30 | 30 | 30 | 26 | 26 | 26 | 26 | 26 | 22 | 22 | 22 | 18 | 18 | 18 | 18 | 18 | 14 | 14 | 14 | 10 | 10 | 10 | 10 | 10 | 6 | 6 | 6 | 2 | 2 | 2 | 35 | 35 | 35 | 35 | 35 | 35 | 35 | 35 | 35 | 35 | |

[FIG. 29a]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 0 | 2 | 2 | 2 | 2 | 2 | 10 | 10 | 10 | 10 | 10 | 10 | 10 | 10 | 18 | 18 | 18 | 18 | 18 | 18 | 18 | 18 | 26 | 26 | 26 | 26 | 26 | 26 | 26 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 34 | 34 | 26 | 26 | 26 | 26 | 26 | 26 | 26 | 18 | 18 | 18 | 18 | 18 | 18 | 18 | 18 | 18 | 10 | 10 | 10 | 10 | 10 | 10 | 10 | 2 | 2 | 2 | 2 | 2 | 2 | 2 | 2 | 2 | 2 | 2 | 2 | 2 | 2 | 2 | |

[FIG. 29b]

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 2 | 2 | 10 | 10 | 10 | 10 | 10 | 10 | 10 | 10 | 18 | 18 | 18 | 18 | 18 | 18 | 18 | 18 | 26 | 26 | 26 | 26 | 26 | 26 | 26 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 34 | 34 | 26 | 26 | 26 | 26 | 26 | 26 | 26 | 18 | 18 | 18 | 18 | 18 | 18 | 18 | 18 | 18 | 10 | 10 | 10 | 10 | 10 | 10 | 10 | 2 | 2 | 2 | 2 | 2 | 35 | 35 | 35 | 35 | 35 | 35 | 35 | 35 | 35 | 35 | |

【FIG. 30a】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 0 | 2 | 2 | 2 | 2 | 2 | 2 | 2 | 2 | 2 | 2 | 2 | 2 | 18 | 18 | 18 | 18 | 18 | 18 | 18 | 18 | 18 | 18 | 18 | 34 | 34 | 34 | 34 | 34 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 34 | 34 | 34 | 34 | 34 | 34 | 34 | 34 | 18 | 18 | 18 | 18 | 18 | 18 | 18 | 18 | 18 | 18 | 18 | 2 | 2 | 2 | 2 | 2 | 2 | 2 | 2 | 2 | 2 | 2 | 2 | 2 | 2 | 2 | 2 | 2 | 2 | 2 | 2 | 2 | |

【FIG. 30b】

| Intra mode | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 2 | 2 | 2 | 2 | 2 | 2 | 2 | 2 | 2 | 18 | 18 | 18 | 18 | 18 | 18 | 18 | 18 | 18 | 18 | 18 | 34 | 34 | 34 | 34 | 34 | 34 | 34 | 34 | 34 |
| Intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | |
| NSST Set | 34 | 34 | 34 | 34 | 34 | 34 | 34 | 34 | 34 | 34 | 34 | 18 | 18 | 18 | 18 | 18 | 18 | 18 | 18 | 18 | 18 | 18 | 2 | 2 | 2 | 2 | 2 | 2 | 2 | 2 | 2 | 2 | 2 | 35 | 35 | 35 | 35 | 35 | 35 | 35 | 35 | 35 | 35 | |

[FIG. 31]
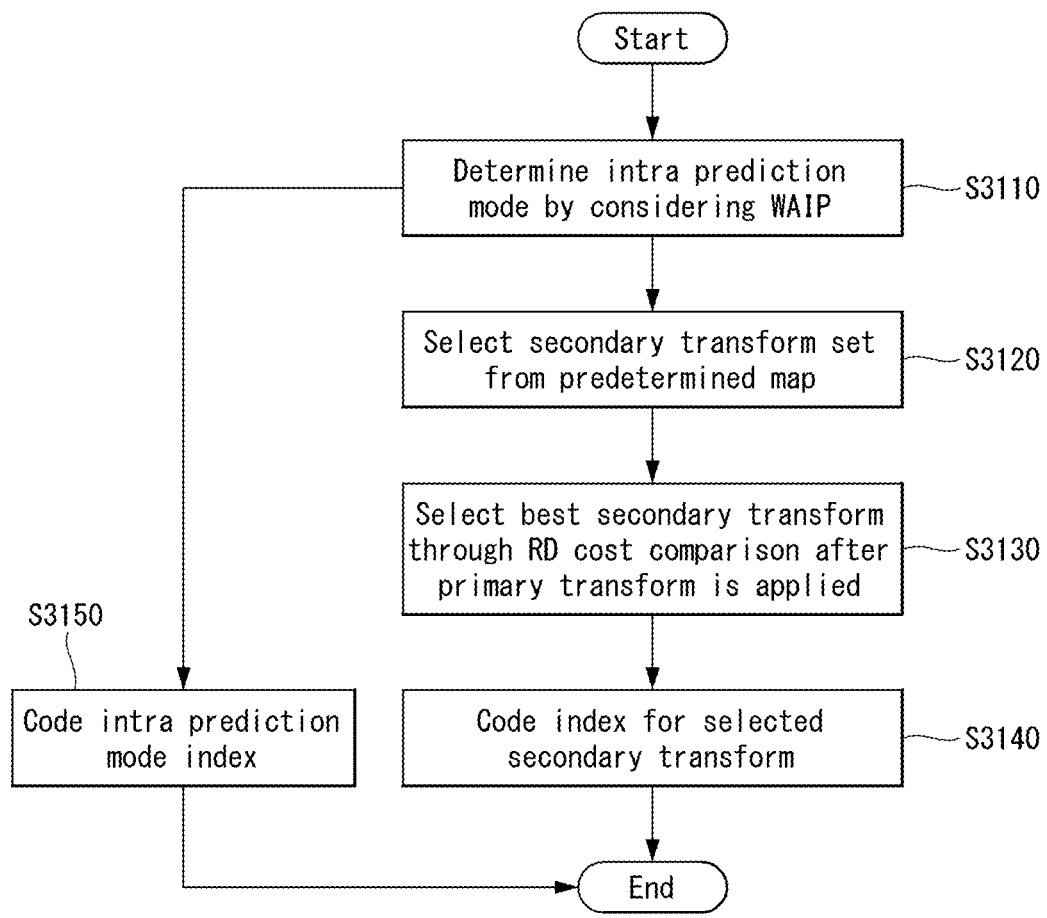

[FIG. 32]
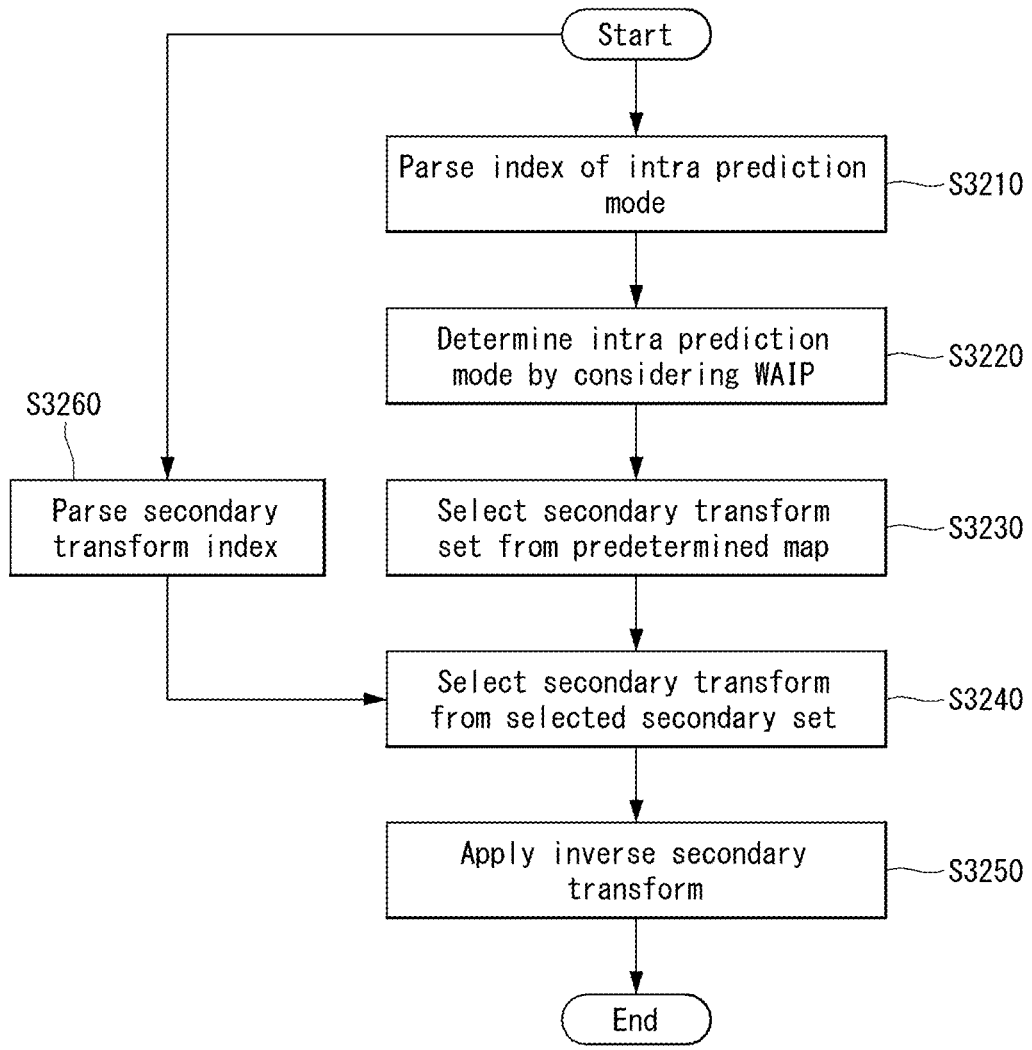

[FIG. 33]
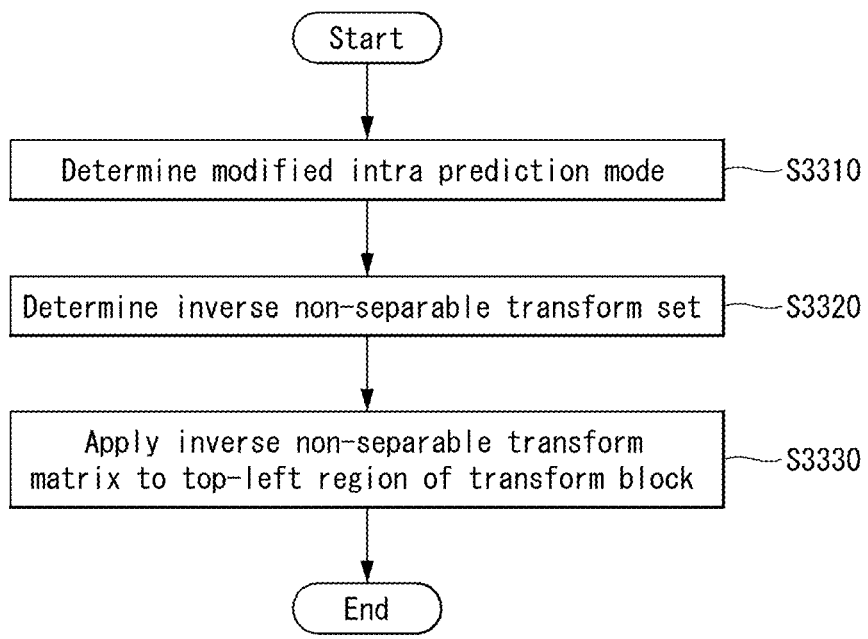

[FIG. 34]
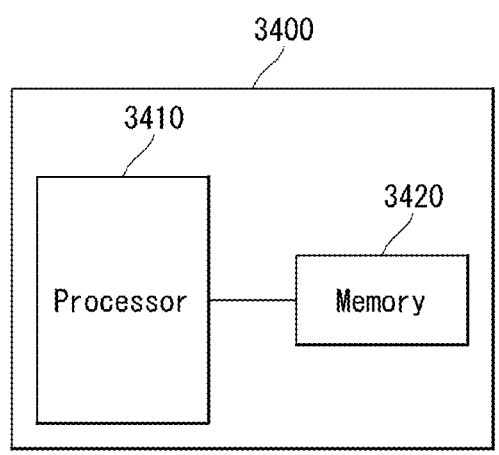

[FIG. 35]
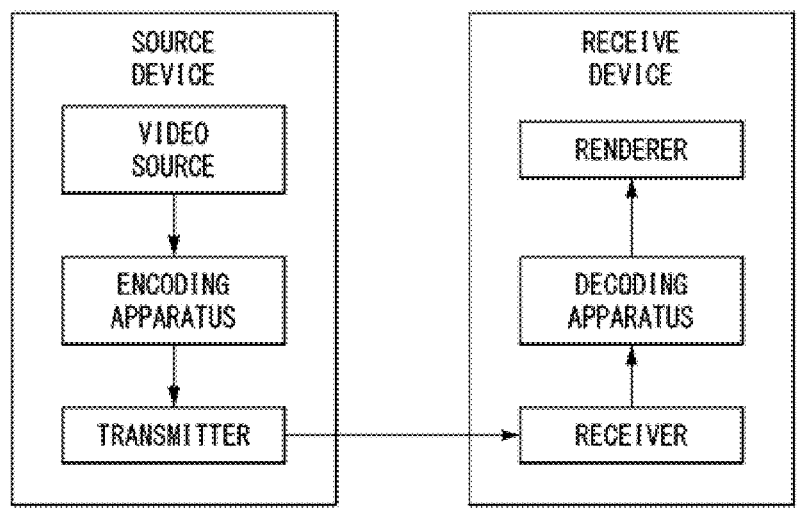

[FIG. 36]
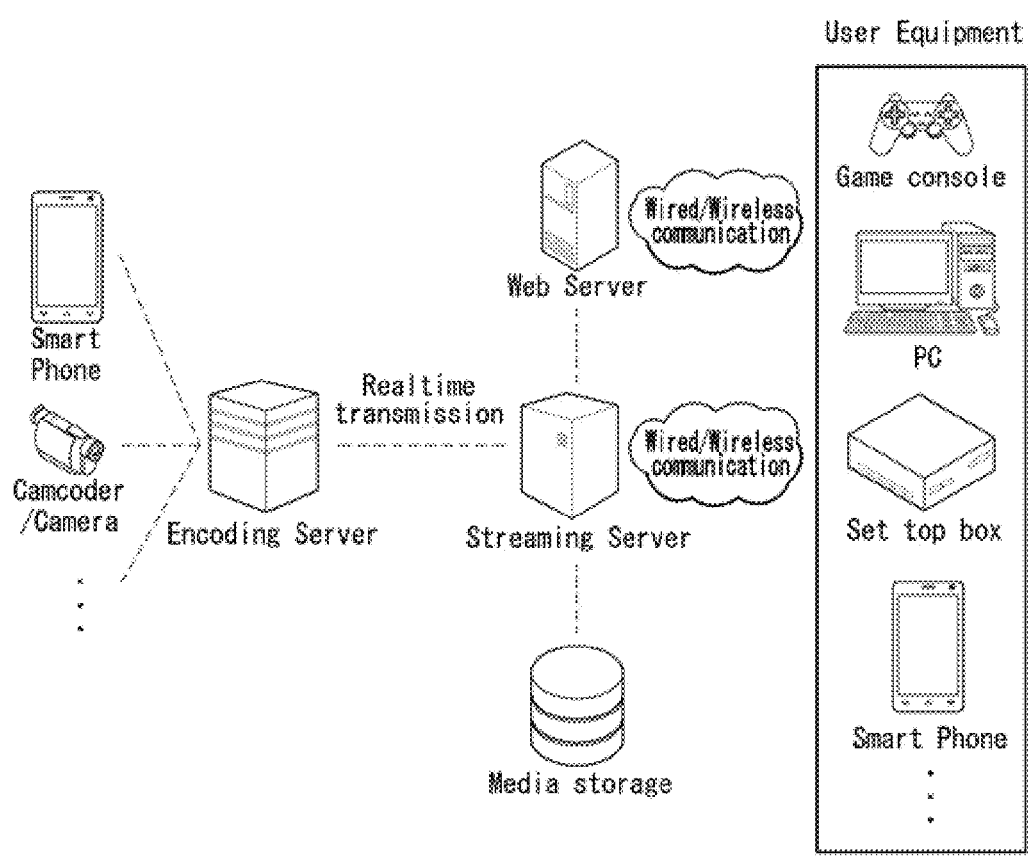

METHOD AND APPARATUS FOR PERFORMING NON-SEPARABLE TRANSFORM BASED ON MODIFIED INTRA PREDICTION MODE

CROSS-REFERENCE TO RELATED APPLICATIONS

This application is a continuation of International Application No. PCT/KR2019/010231, filed on Aug. 12, 2019, which claims the benefit of U.S. Provisional Application No. 62/717,890, filed on Aug. 12, 2018, the contents of which are all hereby incorporated by reference herein in their entirety.

TECHNICAL FIELD

The present disclosure relates to a method and apparatus for processing a video signal and, more particularly, to a method and apparatus for encoding or decoding a video signal to which a transform in which a wide angle intra prediction mode is considered is applied.

BACKGROUND ART

Compression encoding means a series of signal processing techniques for transmitting digitized information through a communication line or storing information in a form suitable for a storage medium. Media including a video, an image, an audio, etc. may be a target for compression encoding. In particular, a technique for performing compression encoding on an image is referred to as image compression.

Next generation image content will have characteristics of high spatial resolution, a high frame rate and high dimensionality of a scene representation. In order to process such content, a drastic increase in memory storage, a memory access rate and processing power will result.

Accordingly, it is necessary to design a coding tool for efficiently processing next-generation image content. In particular, an image codec standard after the high efficiency image coding (HEVC) standard, together with a prediction technology having higher accuracy, requires an efficient transform technology for transforming an image signal in a spatial domain into a signal in a frequency domain.

DISCLOSURE

Technical Problem

There is a need for a method and apparatus for providing an effective transform technology according to a prediction mode along with a prediction scheme having higher accuracy.

Accordingly, embodiments of the present disclosure are intended to provide an image signal processing method and apparatus for providing a transform capable of supporting a prediction mode having high accuracy.

Furthermore, embodiments of the present disclosure provide an image signal processing method and apparatus for providing a transform capable of supporting an efficient prediction mod through the derivation of a low frequency non-separable transform into which a wide angle intra prediction mode has been incorporated.

Technical objects to be achieved by the present disclosure are not limited to the aforementioned objects, and other technical objects not described above may be clearly understood by those skilled in the art to which the present disclosure pertains from the following description.

Technical Solution

A method of decoding an image signal according to an embodiment of the present disclosure includes determining a modified intra prediction mode of a current block having a different width and height from an intra prediction mode, based on a ratio between the width and height of the current block and the intra prediction mode, determining an inverse non-separable transform set based on the modified intra prediction mode, and applying an inverse non-separable transform matrix, selected from the inverse non-separable transform set, to a top-left region of the current block determined based on the width and height of the current block.

Furthermore, determining the modified intra prediction mode may include determining, as the modified intra prediction mode, a value obtained by adding 65 to the intra prediction mode when the width is greater than the height, and the intra prediction mode is greater than or equal to 2 and is smaller than a first reference value.

Furthermore, the first reference value may be set to 8 when a ratio of the width of the current block divided by the height is smaller than or equal to 2, and the first reference value may be set to 12 when the ratio of the width of the current block divided by the height is greater than 2.

Furthermore, determining the modified intra prediction mode may include determining, as the modified intra prediction mode, a value obtained by subtracting 67 from the intra prediction mode when the width is smaller than the height, and the intra prediction mode is greater than or equal to a second reference value and is smaller than or equal to 66.

Furthermore, the second reference value may be set to 61 when the ratio of the height of the current block divided by the width is smaller than or equal to 2, and the second reference value may be set to 57 when the ratio of the height of the current block divided by the width is greater than 2.

Furthermore, determining the inverse non-separable transform set may include determining an index of the inverse non-separable transform set corresponding to the modified intra prediction mode.

Furthermore, the index may be determined as a first index value when the modified intra prediction mode is greater than or equal to 0 and smaller than or equal to 1, the index may be determined as a second index value wherein when the modified intra prediction mode is greater than or equal to 2 and smaller than or equal to 12, the index may be determined as a third index value when the modified intra prediction mode is greater than or equal to 13 and smaller than or equal to 23, the index may be determined as a fourth index value when the modified intra prediction mode is greater than or equal to 24 and smaller than or equal to 44, the index may be determined as the third index value when the modified intra prediction mode is greater than or equal to 45 and smaller than or equal to 55, the index may be determined as the second index value when the modified intra prediction mode is greater than or equal to 56, and the index may be determined as the second index value when the modified intra prediction mode is smaller than 0.

An apparatus for decoding an image signal according to another embodiment of the present disclosure includes a memory storing the image signal and a processor coupled to the memory and configured to process the image signal, wherein the processor is configured to determine a modified intra prediction mode of a current block having a different width and height based on a ratio between the width and height of the current block and an intra prediction mode, determine an inverse non-separable transform set based on the modified intra prediction mode, and apply an inverse non-separable transform matrix, selected from the inverse non-separable transform set, to a top-left region of the current block determined based on the width and height of the current block.

Furthermore, the processor may be configured to determine, as the modified intra prediction mode, a value obtained by adding 65 to the intra prediction mode when the width is greater than the height and the intra prediction mode is greater than or equal to 2 and is smaller than a first reference value.

Furthermore, the processor may be configured to determine, as the modified intra prediction mode, a value obtained by subtracting 67 from the intra prediction mode when the width is smaller than the height, and the intra prediction mode is greater than or equal to a second reference value and is smaller than or equal to 66.

Furthermore, the processor may be configured to determine an index of the inverse non-separable transform set corresponding to the modified intra prediction mode.

Furthermore, the index may be determined as a first index value when the modified intra prediction mode is greater than or equal to 0 and smaller than or equal to 1, the index may be determined as a second index value wherein when the modified intra prediction mode is greater than or equal to 2 and smaller than or equal to 12, the index may be determined as a third index value when the modified intra prediction mode is greater than or equal to 13 and smaller than or equal to 23, the index may be determined as a fourth index value when the modified intra prediction mode is greater than or equal to 24 and smaller than or equal to 44, the index may be determined as the third index value when the modified intra prediction mode is greater than or equal to 45 and smaller than or equal to 55, the index may be determined as the second index value when the modified intra prediction mode is greater than or equal to 56, and the index may be determined as the second index value when the modified intra prediction mode is smaller than 0.

Advantageous Effects

According to an embodiment of the present disclosure, a transform matrix capable of supporting a prediction mode having high accuracy can be designed.

Furthermore, according to an embodiment of the present disclosure, prediction accuracy can be increased and the design complexity of a transform matrix can be reduced by deriving a low frequency non-separable transform which incorporates a wide angle intra prediction mode.

Effects which may achieved by the present disclosure are not limited to the aforementioned effects, and other effects and advantages of the present disclosure will be more clearly understood by a person skilled in the art to which the present disclosure pertains from the following description.

DESCRIPTION OF DRAWINGS

The accompanying drawings, which are included to provide further understanding of the present disclosure and constitute a part of the detailed description, illustrate embodiments of the present disclosure and serve to explain technical features of the present disclosure together with the description.

FIG. 1 is an embodiment to which the present disclosure is applied, and illustrates a schematic block diagram of an encoder in which the encoding of an image signal is performed.

FIG. 2 is an embodiment to which the present disclosure is applied, and illustrates a schematic block diagram of a decoder in which the decoding of an image signal is performed.

FIG. 3 illustrates embodiments to which the present disclosure may be applied, wherein FIGS. 3A, 3B, 3C, and 3D are diagrams for describing block division structures based on a quadtree, a binary tree, a ternary tree, and an asymmetric tree, respectively.

FIGS. 4 and 5 are embodiments to which the present disclosure is applied, wherein FIG. 4 illustrates a schematic block diagram of transform and quantization units and inverse quantization unit and inverse transform units within the encoder, and FIG. 5 illustrates a schematic block diagram of inverse quantization and inverse transform units within the decoder.

FIGS. 6a and 6b illustrate examples of tables for determining a transform type in a horizontal direction and vertical direction for each prediction mode.

FIG. 7 is an embodiment to which the present disclosure is applied, and is a flowchart illustrating an encoding process performed by Multiple Transform Selection (MTS).

FIG. 8 is an embodiment to which the present disclosure is applied, and is a flowchart illustrating a decoding process in which MTS is performed.

FIG. 9 is an embodiment to which the present disclosure is applied, and is a flowchart for describing a process of encoding an MTS flag and an MTS index.

FIG. 10 is an embodiment to which the present disclosure is applied, and is a flowchart for illustrating a decoding process of applying a horizontal transform or a vertical transform to a row or column based on an MTS flag and an MTS index.

FIG. 11 is an embodiment to which the present disclosure is applied, and illustrates a flowchart in which an inverse transform is performed based on a transformrelated parameter.

FIG. 12 is an embodiment to which the present disclosure is applied, and is a table illustrating that a transform set is assigned to each intra-prediction mode in a non-separable secondary transform (NSST).

FIG. 13 is an embodiment to which the present disclosure is applied, and illustrates a calculation flow diagram for Givens rotation.

FIG. 14 is an embodiment to which the present disclosure is applied, and illustrates one round configuration in a 4×4 NSST composed of a Givens rotation layer and permutations.

FIG. 15 is an embodiment to which the present disclosure is applied, and is a block diagram for describing operations of a forward reduced transform and an inverse reduced transform.

FIG. 16 is an embodiment to which the present disclosure is applied, and is a diagram illustrating a process of performing an inverse scan from a 64-th to a 17-th according to an inverse scan order.

FIG. 17 is an embodiment to which the present disclosure is applied, and illustrates a flowchart in which an image signal is encoded through a primary transform and a secondary transform.

FIG. 18 is an embodiment to which the present disclosure is applied, and illustrates a flowchart in which an image signal is decoded through an inverse secondary transform and an inverse primary transform.

FIG. 19 is an embodiment to which the present disclosure is applied, and illustrates an example of an intra prediction mode configuration composed of 67 modes.

FIG. 20 is an embodiment to which the present disclosure is applied, and illustrates an example of a mapping table for 67 intra prediction modes of 35 intra prediction modes.

FIG. 21 is an embodiment to which the present disclosure is applied, and illustrates an example in which two wide angle modes have been additionally configured in the 35 intra prediction modes.

FIG. 22 is an embodiment to which the present disclosure is applied, and illustrates an example in which 10 wide angle modes have been additionally configured in the 35 intra prediction modes.

FIG. 23 is an embodiment to which the present disclosure is applied, and illustrates an example of an index mapping table between added wide angle modes in the 35 intra prediction modes and the 67 intra prediction modes.

FIGS. 24 and 25 are embodiments to which the present disclosure is applied, and illustrate examples of an intra prediction for a non-square block.

FIG. 26 is an embodiment to which the present disclosure is applied, and illustrates an example of an order in which pixels are arranged when a two-dimensional block is changed into a one-dimensional vector, wherein FIG. 26*a* illustrates an example of a row-first order, and FIG. 26*b* illustrates an example of a column-first order.

FIG. 27 is an embodiment to which the present disclosure is applied, and illustrates an example of a mapping table between 35 transform sets and an intra prediction mode, wherein FIG. 27*a* illustrates an example of a case where a transform set is symmetrically assigned to each wide angle mode, FIG. 27*b* illustrates an example of a case where a No. 2 transform set is assigned to all wide angle modes, and FIG. 27*c* illustrates an example of a case where the same additional transform set is assigned to all wide angle modes.

FIG. 28 is an embodiment to which the present disclosure is applied, and illustrates an example of a mapping table between 10 transform sets and an intra prediction mode, wherein FIG. 28*a* illustrates an example of a case where a No. 2 transform set is assigned to each wide angle mode, and FIG. 28*b* illustrates an example of a case where the same additional transform set is assigned to all wide angle modes.

FIG. 29 is an embodiment to which the present disclosure is applied, and illustrates an example of a mapping table between six transform sets and an intra prediction mode, wherein FIG. 29*a* illustrates an example of a case where a No. 2 transform set is assigned to each wide angle mode, and FIG. 29*b* illustrates an example of a case where the same additional transform set is assigned to all wide angle modes.

FIG. 30 is an embodiment to which the present disclosure is applied, and illustrates an example of a mapping table between four transform sets and an intra prediction mode, wherein FIG. 30*a* illustrates an example of a case where a No. 2 transform set is assigned to each wide angle mode, and FIG. 30*b* illustrates an example of a case where the same additional transform set is assigned to all wide angle modes.

FIG. 31 is an embodiment to which the present disclosure is applied, and illustrates an example of a flowchart in which the encoder performs a transform by considering wide angle intra prediction (WAIP).

FIG. 32 is an embodiment to which the present disclosure is applied, and illustrates an example of a flowchart in which the decoder performs a transform by considering WAIP.

FIG. 33 is an embodiment to which the present disclosure is applied, and illustrates another example of a flowchart in which the decoder performs a transform by considering WAIP.

FIG. 34 is an embodiment to which the present disclosure is applied, and illustrates an example of a block diagram of an image processing apparatus.

FIG. 35 illustrates an example of an image coding system in an embodiment to which the present disclosure is applied.

FIG. 36 illustrates an example of an image streaming system in an embodiment to which the present disclosure is applied.

MODE FOR INVENTION

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core function of each structure and device.

Further, although general terms widely used currently are selected as the terms in the present disclosure as much as possible, a term that is arbitrarily selected by the applicant is used in a specific case. Since the meaning of the term will be clearly described in the corresponding part of the description in such a case, it is understood that the present disclosure will not be simply interpreted by the terms only used in the description of the present disclosure, but the meaning of the terms should be figured out.

Specific terminologies used in the description below may be provided to help the understanding of the present disclosure. Furthermore, the specific terminology may be modified into other forms within the scope of the technical concept of the present disclosure. For example, a signal, data, a sample, a picture, a frame, a block, etc may be properly replaced and interpreted in each coding process.

In the present disclosure, a 'processing unit' refers to a unit on which encoding/decoding process such as prediction, transform and/or quantization is performed. The processing unit may also be interpreted as the meaning including a unit for a luminance component and a unit for a chrominance component. For example, the processing unit may correspond to a block, a coding unit (CU), a prediction unit (PU) or a transform unit (TU).

The processing unit may also be interpreted as a unit for a luminance component or a unit for a chrominance component. For example, the processing unit may correspond to a coding tree block (CTB), a coding block (CB), a prediction unit (PU) or a transform block (TB) for the luminance component. Alternatively, the processing unit may correspond to a CTB, a CB, a PU or a TB for the chrominance component. The processing unit is not limited thereto and may be interpreted as the meaning including a unit for the luminance component and a unit for the chrominance component.

In addition, the processing unit is not necessarily limited to a square block and may be configured in a polygonal shape having three or more vertexes.

In the present disclosure, a pixel is commonly called a sample. In addition, using a sample may mean using a pixel value or the like.

FIG. 1 is an embodiment to which the present disclosure is applied, and illustrates a schematic block diagram of an encoder in which the encoding of an image signal is performed.

Referring to FIG. 1, the encoder 100 may be configured to include an image division unit 110, a transform unit 120, a quantization unit 130, a inverse quantization unit 140, an inverse transform unit 150, a filtering unit 160, a decoded picture buffer (DPB) 170, an inter-prediction unit 180, an intra-prediction unit 185, and an entropy encoding unit 190.

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU). In the following description, a transform unit (TU), that is, a unit on which a transform is performed is collectively referred to as a transform block.

However, the terms are only used for the convenience of description of the present disclosure and the present disclosure is not limited to the definition of the terms. In addition, in the present disclosure, for the convenience of the description, the term coding unit is used as a unit used in encoding or decoding an image signal, but the present disclosure is not limited thereto and may be appropriately interpreted according to the present disclosure.

The encoder 100 subtracts a prediction signal output from the inter-prediction unit 180 or the intra-prediction unit 185 from the input image signal to generate a residual signal and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as Multiple Transform Selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

A plurality of transforms (or transform combinations) may be determined based on a kernel of a discrete cosine transform (DCT) or discrete sine transform (DST) type as illustrated in FIGS. 6a and 6b of the present disclosure. In the present disclosure, the transform type may be expressed like DCT-Type 2, DCT-II, DCT-2, DCT2, for example, and is generally indicated as DCT-2 in the following description.

The transform unit 120 according to an embodiment of the present disclosure may perform the following embodiments.

The transform unit 120 may apply a forward primary transform to each of the horizontal direction and vertical direction of a transform block including residual samples, and may apply a secondary transform based on the size of the transform block (or current block). For example, when the size of the current block is greater than or equal to 4×4, a non-separable secondary transform (NSST) and/or a reduced secondary transform (RST) to be described later may be applied. In an embodiment, an NSST and/or an RST may be applied to a top-left 4×4 or 8×8 region based on the width and height of a current block. In this document, "M×N" indicative of the size of a block (matrix) indicates the width and height of the block. For example, if the size of a block is greater than or equal to 4×4, this means that both the width and height of the block is greater than or equal to 4.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bit stream.

Although the transform unit 120 and the quantization unit 130 are described as separate functional units, the present disclosure is not limited thereto and may be combined into one functional unit. The inverse quantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the inverse quantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for the current picture is reduced through the filtering process to enhance the image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. In this case, since the reference picture used for prediction is a transformed signal that is quantized and inverse quantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. In this case, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

FIG. 2 is an embodiment to which the present disclosure is applied, and illustrates a schematic block diagram of a decoder in which the decoding of an image signal is performed.

Referring to FIG. 2, the decoder 200 may be configured to include a parsing unit (not illustrated), an entropy decoding unit 210, a inverse quantization unit 220, an inverse transform unit 230, a filtering unit 240, a decoded picture buffer (DPB) unit 250, an inter-prediction unit 260, and an intra-prediction unit 265.

In addition, a reconstructed image signal output through the decoder 200 may be reproduced through a reproduction device.

The decoder 200 may receive the signal output from the encoder 100 of FIG. 1 and the received signal may be entropy-decoded through the entropy decoding unit 210.

The inverse quantization unit 220 obtains the transform coefficient from an entropy-decoded signal by using quantization step size information.

The inverse transform unit 230 inversely transforms the transform coefficient to obtain the residual signal.

When the size of a transform block is greater than or equal to 4×4, the inverse transform unit 230 according to an embodiment of the present disclosure may be configured to apply an inverse non-separable secondary transform to the transform block, separate the transform block in a horizontal and vertical direction, and apply an inverse primary transform. For example, an inverse NSST and/or an inverse RST may be applied to a top-left 4×4 or 8×8 region based on the width and height of a current block.

Although the dequantization unit 220 and the inverse transform unit 230 are described as separate functional units, the present disclosure is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In the present disclosure, the embodiments described in the transform unit 120 and the respective functional units of the encoder 100 may be equally applied to the inverse transform unit 230 and the corresponding functional units of the decoder, respectively.

FIG. 3 illustrates embodiments to which the present disclosure may be applied, FIG. 3a is a diagram for describing a block split structure based on a quadtree (hereinafter referred to as a "QT"), FIG. 3b is a diagram for describing a block split structure based on a binary tree (hereinafter referred to as a "BT"), FIG. 3c is a diagram for describing a block split structure based on a ternary tree (hereinafter referred to as a "TT"), and FIG. 3d is a diagram for describing a block split structure based on an asymmetric tree (hereinafter referred to as an "AT").

In image coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (1/2N×2N, N×2N, 1/2N×2N). The AT may have four types of splits of a horizontal-up AT (2N×1/2N, 2N×3/2N), a horizontal-down AT (2N×3/2N, 2N×1/2N), a vertical-left AT (1/2N×2N, 3/2N×2N), and a vertical-right AT (3/2N×2N, 1/2N×2N). Each BT, TT, or AT may be further split recursively using the BT, TT, or AT.

FIG. 3a illustrates an example of a QT split. A block A may be split into four subblocks A0, A1, A2, and A3 by a QT. The subblock A1 may be split into four subblocks B0, B1, B2, and B3 by a QT.

FIG. 3b illustrates an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3c illustrates an example of a TT split. A block B3 that is no longer split by a QT may be split into vertical TTs C0, 01, and C2 or horizontal TTs D0, D1, and D2. As in the block C1, each subblock may be further split recursively like the form of horizontal TTs E0, E1, and E2 or vertical TTs F0, F1, and F2.

FIG. 3d illustrates an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

A transform may be performed for each processing unit (or transform unit) divided by a division structure, such as FIGS. 3a to 3d. In particular, a division may be performed for each row direction and each column direction, and a transform matrix may be applied. According to an embodiment of the present disclosure, a different transform type may be used based on the length of a processing unit (or transform unit) in the row direction or column direction.

FIGS. 4 and 5 are embodiments to which the present disclosure is applied. FIG. 4 illustrates a schematic block diagram of a transform and quantization unit 120/130 and a dequantization and transform unit 140/150 within the encoder, and FIG. 5 illustrates a schematic block diagram of a dequantization and transform unit 220/230 within the decoder.

Referring to FIG. 4, the transform and quantization unit 120/130 may include a primary transform unit 121, a secondary transform unit 122 and the quantization unit 130. The dequantization and transform unit 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the present disclosure, when a transform is performed, the transform may be performed through a plurality of steps. For example, as illustrated in FIG. 4, two steps of a primary transform and a secondary transform may be applied or more transform steps may be used according to an algorithm. In this case, the primary transform may be referred to as a core transform.

The primary transform unit 121 may apply a primary transform on a residual signal. In this case, the primary transform may be pre-defined in a table form in the encoder and/or the decoder.

Furthermore, combinations of several transform types (DCT-2, DST-7, DCT-8) of MTS may be used for the primary transform. For example, a transform type may be determined as in the tables illustrated in FIGS. 6a and 6b.

The secondary transform unit 122 may apply a secondary transform to a primary-transformed signal. In this case, the secondary transform may be pre-defined as a table in the encoder and/or the decoder.

In one embodiment, the non-separable secondary transform (NSST) may be conditionally applied to the secondary transform. For example, the NSST may be applied to only an intra prediction block, and may have a transform set which may be applied to each prediction mode group.

In this case, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may include two transforms. In respect to the remaining direction modes, each transform set may include three transforms.

The quantization unit 130 may perform quantization on a secondary-transformed signal.

The inverse quantization unit and the inverse transform unit 140/150 inversely perform the aforementioned process, and a redundant description thereof is omitted.

FIG. 5 is a schematic block diagram of a dequantization unit 220 and an inverse transform unit 230 in a decoder.

Referring to FIG. 5 above, the dequantization and inverse transform units 220 and 230 may include a dequantization unit 220, an inverse secondary transform unit 231, and an inverse primary transform unit 232.

The dequantization unit 220 obtains the transform coefficient from an entropy-decoded signal by using quantization step size information.

The inverse secondary transform unit 231 performs an inverse secondary transform for the transform coefficients. In this case, the inverse secondary transform represents an inverse transform of the secondary transform described in FIG. 4.

The inverse primary transform unit 232 performs an inverse primary transform for the inverse secondary transformed signal (or block) and obtains the residual signal. In this case, the inverse primary transform represents the inverse transform of the primary transform described in FIG. 4.

In one embodiment, combinations of several transforms (DCT-2, DST-7, DCT-8) of MTS may be applied to the primary transform. For example, a transform type may be determined as in the tables illustrated in FIGS. 6a and 6b.

FIGS. 6a and 6b illustrate examples of tables for determining a transform type for a horizontal direction and a vertical direction for each prediction mode. FIG. 6a illustrates an example of the table for determining transform types in the horizontal/vertical direction in an intra-prediction mode. FIG. 6b illustrates an example of the table for determining transform types for the horizontal/vertical direction in an inter-prediction mode. FIGS. 6a and 6b are examples of combination tables for determining transform types, illustrates MTS combinations applied to a joint exploration model (JEM). Another combination may also be used. For example, the table of FIG. 6b may be used for both an intra-prediction and an inter-prediction. Examples applied to the JEM are basically described with reference to FIGS. 6a and 6b.

In the JEM, the application of MTS may become on/off in a block unit (in the case of HEVC, in a CU unit) because a syntax element called EMT_CU_flag (or MTS_CU_flag) is introduced. That is, in the intra-prediction mode, when MTS_CU_flag is 0, DCT-2 or DST-7 (for a 4×4 block) in the existing high efficiency image coding (HEVC) is used. When MTS_CU_flag is 1, an MTS combination proposed in FIG. 6a is used. A possible MTS combination may be different depending on an intra-prediction mode as illustrated in FIG. 6a. For example, a total of possible four combinations are permitted because DST-7 and DCT-5 are used in the horizontal direction and DST-7 and DCT-8 are used in the vertical direction, with respect to 14, 15, 16, 17, 18, 19, 20, 21, 22 modes. Accordingly, there is a need for signaling of information on which one of the four combinations is used. One of the four combinations is selected through MTS_TU_index having two bits. FIG. 6b illustrates MTS combinations which may be applied in an inter-prediction mode. Unlike in FIG. 6a, a combination which is possible based on only DST-7 and DCT-8 is determined. According to an embodiment of the present disclosure, EMT_CU_flag may be used instead of MTS_CU_flag. For example, Set 2 of FIG. 6a may be used if an intra prediction mode is applied, and FIG. 6b may be used if an inter prediction mode is applied.

FIG. 7 is an embodiment to which the present disclosure is applied, and is a flowchart illustrating an encoding process in which MTS is performed.

In the present disclosure, basically, embodiments in which transforms are applied in the horizontal direction and the vertical direction are basically described. However, a transform combination may be configured with a non-separable transform.

Alternatively, a mixture of separable transforms and non-separable transforms may be configured. In this case, if the non-separable transform is used, transform selection for each row/column or selection for each horizontal/vertical direction becomes unnecessary. The transform combinations of FIG. 6a or 6b may be used only when the separable transform is selected.

Furthermore, the methods proposed in the present disclosure may be applied regardless of a primary transform or a secondary transform. That is, there are no limitations in applying the methods to only any one of a primary transform or a secondary transform, and the methods may be applied to both a primary transform and a secondary transform. In this case, the primary transform may mean a transform for first transforming a residual block. The secondary transform may mean a transform for applying a transform to a block generated as a result of the primary transform. According to an embodiment of the present disclosure, when the size of a transform block is greater than or equal to 4×4, a secondary transform may be applied to the top-left 4×4 or 8×8 region of the transform block based on the width and height of the transform block.

First, the encoder 100 may determine a transform configuration group corresponding to a current block (S710). In this case, the transform configuration group may be composed of combinations, such as FIGS. 6a and 6b.

The encoder may perform a transform on available candidate transform combinations within the transform configuration group (S720).

As a result of the execution of the transform, the encoder may determine or select a transform combination having the smallest rate distortion (RD) cost (S730).

The encoder may encode a transform combination index corresponding to the selected transform combination (S740).

FIG. 8 is an embodiment to which the present disclosure is applied, and is a flowchart illustrating a decoding process in which MTS is performed.

First, the decoder 200 may determine a transform configuration group for a current block (S810). The decoder 200 may parse (or obtain) a transform combination index from an image signal. In this case, the transform combination index may correspond to one of a plurality of transform combinations within the transform configuration group (S820). For example, the transform configuration group may include DST-4, DCT-4, DST-7 and DCT-8. The transform combination index may be called an MTS index. In an embodiment, the transform configuration group may be configured based on at least one of a prediction mode, a block size or a block shape of the current block.

The decoder 100 may derive a transform combination corresponding to a transform combination index (S830). In this case, the transform combination may be composed of a horizontal transform and a vertical transform, and may include at least one of DCT-2, DST-7 or DCT-8. Furthermore, the transform combinations described with reference to FIG. 6a or 6b may be used for the transform combination. That is, in the present disclosure, a configuration based on another transform combination according to another embodiment is possible.

The decoder 100 may perform an inverse transform on the current block based on the derived transform combination (S840). If the transform combination is configured with a row (horizontal) transform and a column (vertical) transform, after the row (horizontal) transform is first applied, the column (vertical) transform may be applied, but the present disclosure is not limited thereto. If the transform combination is configured in an opposite way or configured with non-separable transforms, a non-separable transform may be applied.

In an embodiment, if a vertical transform or a horizontal transform is DST-7 or DCT-8, an inverse transform of DST-7 or an inverse transform of DST-8 may be applied for each column, and then applied for each row. Furthermore, in the vertical transform or the horizontal transform, a different transform may be applied for each row and/or for each column.

In an embodiment, a transform combination index may be obtained based on an MTS flag indicating whether MTS is performed. That is, the transform combination index may be obtained only when MTS is performed based on an MTS flag. Furthermore, the decoder 100 may check whether the number of non-zero coefficients is greater than a threshold value. In this case, the transform combination index may be obtained only when the number of non-zero coefficients is greater than the threshold value.

In an embodiment, the MTS flag or the MTS index may be defined in at least one level of a sequence, a picture, a slice, a block, a coding unit, a transform unit, or a prediction unit.

In an embodiment, an inverse transform may be applied only when both the width and height of a transform unit are 32 or less.

Meanwhile, in another embodiment, the process of determining the transform configuration group and the process of parsing the transform combination index may be simultaneously performed. Alternatively, step S810 may be preconfigured in the encoder 100 and/or the decoder 200 and omitted.

FIG. 9 is an embodiment to which the present disclosure is applied, and is a flowchart for describing a process of encoding an MTS flag and an MTS index.

The encoder 100 may determine whether MTS is applied to a current block (S910).

If the MTS is applied, the encoder 100 may encode the MTS flag=1 (S920).

Furthermore, the encoder 100 may determine an MTS index based on at least one of a prediction mode, horizontal transform, or vertical transform of the current block (S930). In this case, the MTS index means an index indicative of any one of a plurality of transform combinations for each intra-prediction mode, and the MTS index may be transmitted for each transform unit.

When the MTS index is determined, the encoder 100 may encode the MTS index determined at step S930 (S940).

Meanwhile, if the MTS is not applied, the encoder 100 may encode MTS flag=0 (S950).

FIG. 10 is an embodiment to which the present disclosure is applied, and is a flowchart for illustrating a decoding process of applying a horizontal transform or a vertical transform to a row or column based on an MTS flag and an MTS index.

The decoder 200 may parse an MTS flag from a bit stream (S1010). In this case, the MTS flag may indicate whether MTS is applied to a current block.

The decoder 200 may check whether the MTS is applied to the current block based on the MTS flag (S1020). For example, the decoder 200 may check whether the MTS flag is 1.

When the MTS flag is 1, the decoder 200 may check whether the number of non-zero coefficients is greater than (or equal to or greater than) a threshold value (S1030). For example, the threshold value for the number of transform coefficients may be set to 2. The threshold value may be set based on a block size or the size of a transform unit.

When the number of non-zero coefficients is greater than the threshold value, the decoder 200 may parse an MTS index (S1040). In this case, the MTS index means an index indicative of any one of a plurality of transform combinations for each intra-prediction mode or each inter-prediction mode. The MTS index may be transmitted for each transform unit. Furthermore, the MTS index may mean an index indicative of any one transform combination defined in a pre-configured transform combination table. In this case, the pre-configured transform combination table may mean the tables of FIG. 6a or 6b, but the present disclosure is not limited thereto.

The decoder 100 may derive or determine a horizontal transform and a vertical transform based on at least one of the MTS index or a prediction mode (S1050). Furthermore, the decoder 100 may derive a transform combination corresponding to the MTS index. For example, the decoder 100 may derive or determine a horizontal transform and a vertical transform corresponding to the MTS index.

Meanwhile, when the number of non-zero coefficients is not greater than the threshold value, the decoder 200 may apply a pre-configured vertical inverse transform for each column (S1060). For example, the vertical inverse transform may be an inverse transform of DST-7. Furthermore, the vertical inverse transform may be an inverse transform of DST-8

Furthermore, the decoder may apply a pre-configured horizontal inverse transform for each row (S1070). For example, the horizontal inverse transform may be an inverse transform of DST-7. Furthermore, the horizontal inverse transform may be an inverse transform of DST-8.

That is, when the number of non-zero coefficients is not greater than the threshold value, a transform type pre-configured in the encoder 100 or the decoder 200 may be used. For example, not a transform type defined in a transform combination table, such as FIG. 6a or 6b, but a transform type (e.g., DCT-2) which is commonly used may be used.

Meanwhile, when the MTS flag is 0, the decoder 200 may apply a pre-configured vertical inverse transform for each column (S1080). For example, the vertical inverse transform may be an inverse transform of DCT-2.

Furthermore, the decoder 200 may apply a pre-configured horizontal inverse transform for each row (S1090). For example, the horizontal inverse transform may be an inverse transform of DCT-2. That is, when the MTS flag is 0, a transform type pre-configured in the encoder or the decoder may be used. For example, not a transform type defined in a transform combination table, such as FIG. 6a or 6b, but a transform type which is commonly used may be used.

FIG. 11 is an embodiment to which the present disclosure is applied, and illustrates a flowchart in which an inverse transform is performed based on a transformrelated parameter.

The decoder 200 to which the present disclosure is applied may obtain sps_mts_intra_enabled_flag or sps_mts_inter_enabled_flag (S1110). In this case, sps_mts_intra_enabled_flag indicates whether tu_mts_flag is present in a residual coding syntax a coding unit to which an intra-prediction is applied (intra-coding unit). For example, when sps_mts_intra_enabled_flag=0, tu_mts_flag is not present in the residual coding syntax of the intra-coding unit. When sps_mts_intra_enabled_flag=0, tu_mts_flag is present in the residual coding syntax of the intra-coding unit. Furthermore, sps_mts_inter_enabled_flag indicates whether tu_mts_flag is present in a residual coding syntax of a coding unit to which an inter-prediction is applied (inter-coding unit). For example, when sps_mts_inter_enabled_flag=0, tu_mts_flag is not present in the residual coding syntax of the inter-coding unit. When sps_mts_inter_enabled_flag=0, tu_mts_flag is present in the residual coding syntax of the inter-coding unit.

The decoder 200 may obtain tu_mts_flag based on sps_mts_intra_enabled_flag or sps_mts_inter_enabled_flag (S1120). For example, when sps_mts_intra enabled_flag=1 or sps_mts_inter_enabled_flag=1, the decoder 200 may obtain tu_mts_flag. In this case, tu_mts_flag indicates whether MTS is applied to a residual sample of a luminance transform unit. For example, when tu_mts_flag=0, the MTS is not applied to a residual sample of the luminance transform unit. When tu_mts_flag=1, the MTS is applied to a residual sample of the luminance transform unit. At least one of embodiments described in the present disclosure may be applied with respect to Tu_mts_flag=1.

The decoder 200 may obtain mts_idx based on tu_mts_flag (S1130). For example, when tu_mts_flag=1, the decoder may obtain mts_idx. In this case, mts_idx indicates whether which transform kernel is applied to luminance residual samples according to the horizontal and/or vertical direction of a current transform block. For example, at least one of the embodiments of the present disclosure may be applied to mts_idx. As a detailed example, at least one of the embodiments of FIGS. 6a and 6b, 44a, or 44b may be applied.

The decoder 200 may derive a transform kernel corresponding to mts_idx (S1140). For example, the transform kernel corresponding to mts_idx may be divided and defined into a horizontal transform and a vertical transform.

For another example, different transform kernels may be applied to the horizontal transform and the vertical transform, but the present disclosure is not limited thereto. The same transform kernel may be applied to the horizontal transform and the vertical transform.

In an embodiment, mts_idx may be defined like Table 1.

TABLE 1

| mts_idx[ x0 ][ y0 ] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

Furthermore, the decoder 200 may perform an inverse transform based on the transform kernel derived at step S1140 (S1150).

In FIG. 11, an embodiment in which in order to determine whether to apply MTS, tu_mts_flag is obtained, mts_idx is obtained based on the obtained tu_mts_flag value, and a transform kernel is determined has been basically described, but the present disclosure is not limited thereto. For example, the decoder 200 may determine a transform kernel by directly parsing mts_idx without parsing tu_mts_flag. In this case, Table 1 may be used. That is, when the mts_idx value indicates 0, DCT-2 may be applied in the horizontal/vertical direction. When the mts_idx value indicates a value other than 0, DST-7 or DCT-8 may be applied based on the mts_idx value.

In another embodiment of the present disclosure, a decoding process of performing a transform process is described.

The decoder 200 may check a transform size (nTbS). In this case, the transform size (nTbS) may be a variable indicative of a horizontal sample size of scaled transform coefficients.

The decoder 200 may check a transform kernel type (trType). In this case, the transform kernel type (trType) may be a variable indicative of the type of transform kernel, and various embodiments of the present disclosure may be applied. The transform kernel type (trType) may include a horizontal transform kernel type (trTypeHor) and a vertical transform kernel type (trTypeVer).

Referring to Table 1, the transform kernel type (trType) may indicate DCT-2 when it is 0, may indicate DST-7 when it is 1, and may indicate DCT-8 when it is 2.

The decoder 200 may perform a transform matrix multiplication based on at least one of a transform size (nTbS) or a transform kernel type.

For another example, when the transform kernel type is 1 and the transform size is 4, a previously determined transform matrix 1 may be applied when a transform matrix multiplication is performed.

For another example, when the transform kernel type is 1 and the transform size is 8, a previously determined transform matrix 2 may be applied when a transform matrix multiplication is performed.

For another example, when the transform kernel type is 1 and the transform size is 16, a previously determined transform matrix 3 may be applied when a transform matrix multiplication is performed.

For another example, when the transform kernel type is 1 and the transform size is 32, a previously defined transform matrix 4 may be applied.

Likewise, when the transform kernel type is 2 and the transform size is 4, 8, 16, and 32, previously defined transform matrices 5, 6, 7, and 8 may be applied, respectively.

In this case, each of the previously defined transform matrices 1 to 8 may correspond to any one of various types of transform matrices. For example, the transform matrices of types illustrated in FIG. 6 may be applied.

The decoder 200 may derive a transform sample based on a transform matrix multiplication.

The embodiments may be used, but the present disclosure is not limited thereto. The above embodiment and other embodiments of the present disclosure may be combined and used.

FIG. 12 is an embodiment to which the present disclosure is applied, and is a table illustrating that a transform set is assigned to each intra-prediction mode in an NSST.

The secondary transform unit 122 may apply a secondary transform to a primary transformed signal. In this case, the secondary transform may be pre-defined as a table in the encoder 100 and/or the decoder 200.

In an embodiment, an NSST may be conditionally applied to the secondary transform. For example, the NSST is applied only in the case of an intra-prediction block, and may have an applicable transform set for each prediction mode group.

According to an embodiment of the present disclosure, when the size of a transform block is greater than or equal to 4×4, the NSST may be applied to the top-left 4×4 or 8×8 region of the transform block based on the width and height of the transform block.

In this case, the prediction mode group may be configured based on symmetry for a prediction direction. For example, a prediction mode 52 and a prediction mode 16 are symmetrical to each other with respect to a prediction mode 34 (diagonal direction), and thus may form one group, so the same transform set may be applied to the prediction mode 52 and the prediction mode 16. In this case, when a transform for the prediction mode 52 is applied, input data is transposed and applied. The reason for this is that the prediction mode 52 and the prediction mode 16 have the same transform set.

Meanwhile, the planar mode and the DC mode have respective transform sets because symmetry for a direction is not present. A corresponding transform set may be configured with two transforms. With respect to the remaining direction modes, three transforms may be configured for each transform set, but the present disclosure is not limited thereto. Each transform set may be configured with a plurality of transforms.

FIG. 13 is an embodiment to which the present disclosure is applied, and illustrates a calculation flow diagram for Givens rotation.

In another embodiment, the NSST is not applied to the entire primary transformed block, but may be applied to only a top-left 8×8 region thereof. For example, when the size of the block is equal to or greater than 8×8, the 8×8 NSST is applied. When the size of the block is less than 8×8, the 4×4 NSST is applied. In this case, after the block is divided into 4×4 blocks, the 4×4 NSST may be applied to each of the 4×4 blocks. According to an embodiment of the present disclosure, when the size of a transform block is greater than or equal to 4×4, the NSST may be applied to only the top-left 4×4 region of the transform block.

As another embodiment, even in the case of 4×N/N×4 (N>=16), the 4×4 NSST may be applied.

Since both the 8×8 NSST and the 4×4 NSST follow a transformation combination configuration described in the present disclosure and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 1 below and a matrix product is shown in Equation 2 below.

$$R_\theta = \begin{bmatrix} \cos\theta & -\sin\theta \\ \sin\theta & \cos\theta \end{bmatrix} \quad \text{[Equation 1]}$$

$$t_m = x_m\cos\theta - x_n\sin\theta \quad \text{[Equation 2]}$$
$$t_n = x_m\sin\theta + x_n\cos\theta$$

As illustrated in FIG. 13 above, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 14 illustrates one round configuration in 4×4 NSST constituted by a givens rotation layer and permutations as an embodiment to which the present disclosure is applied.

Referring to FIG. 14 above, it is illustrated that four Givens rotation layers are sequentially processed in the case of the 4×4 NSST. As illustrated in FIG. 14 above, the output data for one Givens rotation layer is transferred as the input data for the next Givens rotation layer through a determined permutation (i.e., shuffling).

As illustrated in FIG. 14 above, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

Furthermore, according to an embodiment, the NSST may be substituted with a reduced secondary transform (RST) to be described hereinafter.

FIG. 15 is an embodiment to which the present disclosure is applied, and is a block diagram for describing operations of a forward reduced transform and an inverse reduced transform.

Reduced Secondary Transform (RST)

Assuming that an orthogonal matrix indicative of one transform has an N×N form, a reduced transform (hereinafter referred to as an "RT") leaves only R of N transform basis vectors (R<N). A matrix for a forward RT for generating a transform coefficient is given as in Equation 3 below.

$$T_{R \times N} = \begin{bmatrix} t_{11} & t_{12} & t_{13} & \cdots & t_{1N} \\ t_{21} & t_{22} & t_{23} & & t_{2N} \\ & \vdots & & \ddots & \vdots \\ t_{R1} & t_{R2} & t_{R3} & \cdots & t_{RN} \end{bmatrix}$$ [Equation 3]

A matrix for an inverse RT is a transpose matrix of the forward RT matrix. The application of the forward RT and the inverse RT is diagrammed like FIG. 15.

Assuming that an RT is applied to a top-left 8×8 block of a transform block that has experienced a primary transform, the RT may be named an 8×8 reduced secondary transform (8×8 RST).

Assuming that an R value in Equation 3 is 16, a forward 8×8 RST has a 16×64 matrix form, and an inverse 8×8 RST has a 64×16 matrix form.

Furthermore, the same transform set configuration as that in FIG. 12 may be applied to an 8×8 RST. That is, a corresponding 8×8 RST may be applied based on the transform set in FIG. 12.

As an embodiment, in FIG. 12, assuming that one transform set is composed of two or three transforms according to an intra prediction mode, one of a maximum of four transforms including a case where a secondary transform is not applied may be configured to be selected. In this case, the one transform may be considered as an identity matrix.

If indices 0, 1, 2, and 3 are assigned to four transforms, respectively, a corresponding transform may be designated by signaling a syntax element called an NSST index for each transform block. That is, in the case of an NSST, an 8×8 NSST may be designated with respect to an 8×8 top-left block based on an NSST index. In an RST configuration, the 8×8 RST may be designated. Furthermore, in this case, a No. 0 index may be assigned as an identity matrix, that is, a case where a secondary transform is not applied.

If a forward 8×8 RST, such as Equation 3, is applied, 16 valid transform coefficients are generated. Accordingly, it may be considered that 64 input data forming an 8×8 region is reduced to 16 output data. From a two-dimensional region viewpoint, only a region of ¼ is filled with valid transform coefficients. Accordingly, a 4×4 lefttop region of FIG. 16 may be filled with 16 output data obtained by applying a forward 8×8 RST.

Furthermore, as described above, a low frequency non-separable transform (LFNST) in which a non-separable transform is applied to a low frequency domain (e.g., the top left 4×4 region of the transform block) may be used as a secondary transform.

FIG. 16 is an embodiment to which the present disclosure is applied, and is a diagram illustrating a process of performing an inverse scan from a 64-th to a 17-th according to an inverse scan order.

FIG. 16 illustrates that scanning is performed on a 17-th coefficient to a 64-th coefficient (in a forward scan order) assuming that the forward scan order starts from 1. However, FIG. 16 illustrates an inverse scan and illustrates that inverse scanning is performed on the 64-th to the 17-th.

Referring to FIG. 16, a top-left 4×4 region is a region of interest (ROI) to which a valid transform coefficient is assigned, and the remaining regions are empted. That is, a value 0 may be assigned to the remaining regions by default.

If a valid non-zero transform coefficient is present in the ROI region of FIG. 16, this means that an 8×8 RST is not applied. In this case, corresponding NSST index coding may be omitted.

In contrast, if a non-zero transform coefficient is not present in regions other than the ROI region of FIG. 16 (if the 8×8 RST is applied, 0 is assigned to the regions other than the ROI), an NSST index may be coded because there is a possibility that the 8×8 RST has been applied.

As described above, conditional NSST index coding may be performed after a residual coding process because it is necessary to check whether a non-zero transform coefficient is present.

According to an embodiment of the present disclosure, when the size of a transform block is greater than or equal to 4×4, the NSST may be applied to a top-left 4×4 or 8×8 region of the transform block.

FIG. 17 is an embodiment to which the present disclosure is applied, and illustrates a flowchart in which an image signal is encoded through a primary transform and a secondary transform.

The encoder 100 may determine (or select) a forward secondary transform based on at least one of a prediction mode, block shape, and/or block size of the current block (S1710). In this case, a candidate for the forward secondary transform may include at least one of the embodiments of FIGS. 6 and/or 12. Furthermore, according to an embodiment of the present disclosure, the encoder 100 may determine the forward secondary transform by considering an intra prediction mode modified by the application of a wide angle intra prediction mode as will be described later.

The encoder 100 may determine the best forward secondary transform through rate-distortion (RD) optimization. The best forward secondary transform may correspond to one of a plurality of transform combinations. The plurality of transform combination may be defined by a transform index. For example, for the RD optimization, the encoder 100 may compare the results of all of the forward secondary transform, quantization, residual coding, etc. performed on each candidate. In this case, an equation, such as cost=rate+λ·distortion or cost=distortion+λ·rate, may be used, but the present disclosure is not limited thereto.

The encoder 100 may signal a secondary transform index corresponding to the best forward secondary transform (S1720). In this case, other embodiments described in the present disclosure may be applied to the secondary transform index.

For example, the transform set configuration of FIG. 12 may be used as the secondary transform index. One transform set is composed of 2 or 3 transforms according to an intra prediction mode. Accordingly, the encoder 100 may be configured to select one of a maximum of four transforms including a case where a secondary transform is not applied. Assuming that indices 0, 1, 2, and 3 are assigned to the four transforms, respectively, the encoder 100 may designate a transform to be applied by signaling a secondary transform index for each transform coefficient block. In this case, the encoder 100 may assign the index 0 as an identity matrix, that is, a case where a secondary transform is not applied. Furthermore, the secondary transform index may be composed like an index mapping table for a case where a wide angle intra prediction mode is applied, as illustrated in FIGS. 27a to 30b.

In another embodiment, the signaling of the secondary transform index may be performed in any one step of 1) prior to residual coding, 2) during residual coding (after the coding of the last non-zero transform coefficient location), or 3) after residual coding. The embodiments are specifically described as follows.

1) A Method of Signaling a Secondary Transform Index Prior to Residual Coding

The encoder 100 may determine a forward secondary transform.

The encoder 100 may code a secondary transform index corresponding to the forward secondary transform.

The encoder 100 may code a location of the last non-zero transform coefficient.

The encoder 100 may perform residual coding on syntax elements other than the location of the last non-zero transform coefficient.

2) A Method of Signaling a Secondary Transform Index During Residual Coding

The encoder 100 may determine a forward secondary transform.

The encoder 100 may code a location of the last non-zero transform coefficient.

If a non-zero transform coefficient is not located in a specific region, the encoder 100 may code a secondary transform index corresponding to the forward secondary transform. In this case, the specific region indicates the remaining regions other than a location where the non-zero transform coefficient may be present when transform coefficients are disposed according to scan order if a reduced secondary transform is applied, but the present disclosure is not limited thereto.

The encoder 100 may perform residual coding on syntax elements other than the location of the last non-zero transform coefficient.

3) A Method of Signaling a Secondary Transform Index after Residual Coding

The encoder 100 may determine a forward secondary transform.

The encoder 100 may code a location of the last non-zero transform coefficient.

The encoder 100 may perform residual coding on syntax elements other than the location of the last non-zero transform coefficient.

If the non-zero transform coefficient is not located in a specific region, the encoder 100 may code a secondary transform index corresponding to the forward secondary transform after residual coding. In this case, the specific region indicates the remaining regions other than the location where the non-zero transform coefficient may be present when transform coefficients are disposed according to scan order if a reduced secondary transform is applied, but the present disclosure is not limited thereto.

Meanwhile, the encoder 100 may perform a forward primary transform on the current block (residual block) (S1730). In this case, step S1710 and/or step S1720 may be similarly applied to the forward primary transform.

The encoder 100 may perform a forward secondary transform on the current block using the best forward secondary transform (S1740). For example, the forward secondary transform may be a reduced secondary transform. The reduced secondary transform means a transform in which N residual data (N×1 residual vector) is inputted and L (L<N) transform coefficient data (L×1 transform coefficient vector) is output.

In an embodiment, the reduced secondary transform may be applied to a specific region of the current block. For example, when the current block is N×N, the specific region may mean a top-left N/2×N/2 region, but the present disclosure is not limited thereto. The specific region may be differently configured based on at least one of a prediction mode, a block shape, or a block size. For example, when the current block is N×N, the specific region may mean a top-left M×M region (M≤N). Furthermore, a non-separable transform (low frequency non-separable transform) may be applied to at least some region (e.g., a top left 4×4 region) corresponding to a low frequency domain of a transform block, as a secondary transform.

Meanwhile, the encoder 100 may generate a transform coefficient block by performing quantization on the current block (S1750).

The encoder 100 may generate a bit stream by performing entropy encoding on the transform coefficient block.

FIG. 18 is an embodiment to which the present disclosure is applied, and illustrates a flowchart in which an image signal is decoded through an inverse secondary transform and an inverse primary transform.

The decoder 200 may obtain a secondary transform index from a bit stream (S1810). In this case, other embodiments described in the present disclosure may be applied to the secondary transform index. For example, the secondary transform index may include at least one of the embodiments of FIGS. 6a, 6b and/or 12. Furthermore, the secondary transform index may be determined based on the index mapping table illustrated in FIGS. 27a to 30b.

In another embodiment, the step of obtaining the secondary transform index may be performed in any one step of 1) prior to residual decoding, 2) during residual decoding (after the decoding of the location of a transform coefficient not the last 0), or 3) after residual decoding.

The decoder 200 may derive a secondary transform corresponding to the secondary transform index (S1820). In this case, a candidate for the secondary transform may include at least one of the embodiments of FIGS. 6 and/or 12.

In this case, steps S1810 and S1820 are embodiments, and the present disclosure is not limited thereto. For example, the decoder 200 may derive a secondary transform based on at least one of a prediction mode, a block shape, and/or a block size of the current block without obtaining a secondary transform index.

Meanwhile, the decoder 200 may obtain a transform coefficient block by entropy decoding the bit stream, and may perform inverse quantization on the transform coefficient block (S1830).

The decoder 200 may perform an inverse secondary transform on the inverse-quantized transform coefficient block (S1840). For example, the inverse secondary transform may be a reduced secondary transform. The reduced secondary transform means a transform in which N residual data (N×1 residual vector) is input and L (L<N) transform coefficient data (L×1 transform coefficient vector) is output.

In an embodiment, the reduced secondary transform may be applied to a specific region of a current block. For example, when the current block is N×N, the specific region may mean a top-left N/2×N/2 region, but the present disclosure is not limited thereto. The specific region may be differently configured based on at least one of a prediction mode, a block shape, or a block size. For example, when the current block is N×N, the specific region may mean a top-left M×M region (M≤N) or M×L (M≤N, L≤N).

Furthermore, a non-separable transform (low frequency non-separable transform) applied to a low frequency domain (e.g., a top left 4×4 region) of a transform block including inverse-quantized transform coefficients may be applied as an inverse secondary transform.

Furthermore, the decoder 200 may perform an inverse primary transform on the inverse secondary transformed results (S1850).

The decoder 200 generates a residual block through step S1850, and generates a reconstruction block by adding the residual block and a prediction block.

Hereinafter, a method and apparatus for performing an efficient transform while improving more prediction accuracy by considering a wide angle intra prediction mode in the aforementioned process of determining a secondary transform (or an inverse secondary transform) are described.

Hereinafter, embodiments of the present disclosure to be described later relate to a still image or moving image encoding/decoding method and apparatus, and more particularly, to secondary transform set mapping for a wide angle mode when wide angle intra prediction (WAIP) is applied and a method and apparatus for applying a secondary transform upon a change into a wide angle mode due to WAIP.

An embodiment of the present disclosure provides a method and apparatus for allocating a secondary transform set to a wide angle mode when WAIP is applied.

Furthermore, an embodiment of the present disclosure provides a method and apparatus for applying a corresponding secondary transform by transposing transform input data (or without transposing transform input data) based on a changed prediction direction when the prediction direction is changed because a condition in which WAIP is applied is satisfied.

Embodiments of the present disclosure can improve compression performance by applying a suitable secondary transform set to each wide angle mode according to the application of a wide angle intra prediction mode and arranging input data based on the wide angle mode, when encoding or decoding a still image or a moving image.

Hereinafter, a non-separable transform described hereinafter may correspond to the aforementioned low frequency non-separable transform (LFNST), non-separable secondary transform (NSST), and/or reduced secondary transform (RST).

FIG. 19 is an embodiment to which the present disclosure is applied, and illustrates an example of an intra prediction mode configuration composed of 67 modes.

An intra (within a frame) prediction method (intra prediction) includes a planar mode and a DC mode, that is, non-directional prediction modes, and a plurality of directional prediction modes having respective directions. The existing image compression standard (e.g., HEVC) uses 35 intra prediction modes. 33 of the 35 intra prediction modes correspond to directional prediction modes. In a versatile image coding (VVC) standard or JEM that is now being discussed, 67 intra prediction modes are now considered or used. The 67 intra prediction modes include a planar mode, a DC mode, and 65 directional intra prediction modes. A configuration of the 67 intra prediction modes may be represented like FIG. 19.

In FIG. 19, portions indicated by solid-line arrows correspond to the existing 35 intra prediction modes, and portions indicated by dotted-line arrows correspond to added directional intra prediction modes.

FIG. 20 is an embodiment to which the present disclosure is applied, and illustrates an example of a mapping table for 67 intra prediction modes of 35 intra prediction modes.

The mapping of indices of the existing 35 intra prediction modes to the indices of the 67 intra prediction modes may be configured like FIG. 20.

As in FIG. 20, in the 67 mode configurations, a No. 0 index and a No. 1 index correspond to a planar mode and a DC mode, respectively. Hereinafter, in this document, a case where intra prediction is configured by the 35 intra prediction modes is referred to as a "35 mode" or a "35 mode configuration." A case where intra prediction is configured by the 67 intra prediction modes is referred to as a "67 mode" or a "67 mode configuration."

FIG. 21 is an embodiment to which the present disclosure is applied, and illustrates an example in which two wide angle modes have been additionally configured in the 35 intra prediction modes.

An example of wide angle intra prediction described through an embodiment of the present disclosure may be the same as FIG. 21. FIG. 21 illustrates an example of a case where in the 35 mode configuration, two wide angle modes 35 and 36 are added in the right direction after the No. 34 mode.

FIG. 22 is an embodiment to which the present disclosure is applied, and illustrates an example in which 10 wide angle modes have been additionally configured in the 35 intra prediction modes.

FIG. 22 illustrates an example of a case where 5 wide angle modes are added in a lower direction and 5 wide angle modes are added in an upper direction in the 35 mode. The modes added in the lower direction have indices of −1, −2, −3, −4, and −5 from the top, and the modes added in the upper direction have indices of 35, 36, 37, 38, and 39 from the left. In the 67 mode, 10 modes may be added in each of lower and upper sides along with the modes added in the 35 mode. In this case, the lower 10 modes may have indices of −1, −2, . . . , −10, and the upper 10 modes may have indices of 67, 68, . . . , 76 indices. A mapping table between the 35 mode and the 67 mode for the added modes may be configured as illustrated in FIG. 23.

FIG. 23 is an embodiment to which the present disclosure is applied, and illustrates an example of an index mapping table between added wide angle modes in the 35 intra prediction modes and the 67 intra prediction modes.

Indices corresponding to wide angle modes not included in FIG. 23, in the 67 mode, are −1, −3, −5, −7, −9, 67, 69, 71, 73, and 75. The indices may be present between Nos. 2 and −2, between Nos. −2 and −4, between Nos. −4 and −6, between Nos. −6 and −8, between Nos. −8 and −10, between Nos. 66 and 68, between Nos. 68 and 70, between Nos. 70 and 72, between Nos. 72 and 74, and between Nos. 74 and 76, respectively, on the basis of the 67 mode.

According to an embodiment of the present disclosure, if a specific condition is satisfied, a modified intra prediction mode (wide angle intra prediction mode) may be used instead of a specific intra prediction mode. For example, prediction using a No. 35 mode instead of the No. 2 mode on the basis of the 35 mode may be performed.

If the width (horizontal length of a transform block (or a transform unit) is written as nWidth and the height (vertical length) thereof is written as nHeight, the index of the intra prediction mode (predModeIntra) may be changed like Table 2.

TABLE 2

When nWidth is not equal to nHeight, predModeIntra is mapped as follows:
- (a) if nWidth/nHeight <= 2 and 2 <= predModeIntra <= 4, predModeIntra = predModeIntra + 33
- (b) if nWidth/nHeight > 2 and 2 <= predModeIntra <= 6, predModeIntra = predModeIntra + 33
- (c) if nHeight/nWidth <= 2 and 32 <= predModeIntra <= 34, predModeIntra = predModeIntra − 35
- (d) if nHeight/nWidth > 2 and 30 <= predModeIntra <= 34, predModeIntra = predModeIntra − 35

A condition in which a modified intra prediction mode according to the application of a wide angle intra prediction mode according to Table 2 is used and a configuration of an index of the modified intra prediction mode are as follows.

(a) When a ratio of a width of a transform block divided by a height (nWidth/nHeight) is smaller than or equal to 2, and an index of an intra mode (predModeIntra) is greater than or equal to 2 and is smaller than or equal to 4 (nWidth/nHeight<=2 and 2<=predModeIntra<=4), an index of a modified intra prediction mode is set as a value obtained by adding 33 to the index of the intra prediction mode (predModeIntra=predModeIntra+33).

(b) When the ratio of the width of the transform block divided by the height (nWidth/nHeight) is greater than 2, and the index of the intra mode (predModeIntra) is greater than or equal to 2 and is smaller than or equal to 6 (nWidth/nHeight>2 and 2<=predModeIntra<=6), the index of the modified intra prediction mode is set as a value obtained by adding 33 to the index of the intra prediction mode (predModeIntra=predModeIntra+33).

(c) When the ratio of the height of the transform block divided by the width (nHeight/nWidth) is smaller than or equal to 2, and the index of the intra mode (predModeIntra) is greater than or equal to 32 and is smaller than or equal to 34 (nHeight/nWidth<=2 and 32<=predModeIntra<=34), the index of the modified intra prediction mode is set as a value obtained by subtracting 35 from the index of the intra prediction mode (predModeIntra=predModeIntra−35).

(d) When the ratio of the height of the transform block divided by the width (nHeight/nWidth) is greater than 2, and the index of the intra mode (predModeIntra) is greater than or equal to 30 and is smaller than or equal to 34 (nHeight/nWidth>2 and 30<=predModeIntra<=34), the index of the modified intra prediction mode is set as a value obtained by subtracting 35 from the index of the intra prediction mode (predModeIntra=predModeIntra−35).

In Table 2, with respect to the cases of (c) and (d), the modified intra prediction mode has a negative number. −1 is assigned in a downward direction right under the No. 2 mode on the basis of FIG. 22, and an index value is decreased toward the lower side one by one.

A condition in which a modified intra prediction mode is used according to the application of a wide angle intra prediction mode on the basis of the 67 mode and a configuration of an index of the modified intra prediction mode may be the same as Table 3.

TABLE 3

When nWidth is not equal to nHeight, predModeIntra is mapped as follows:
- (a) if nWidth/nHeight <= 2 and 2 <= predModeIntra <= 7, predModeIntra = predModeIntra + 65
- (b) if nWidth/nHeight > 2 and 2 <= predModeIntra <= 11, predModeIntra = predModeIntra + 65
- (c) if nHeight/nWidth <= 2 and 61 <= predModeIntra <= 66, predModeIntra = predModeIntra − 67
- (d) if nHeight/nWidth > 2 and 57 <= predModeIntra <= 66, predModeIntra = predModeIntra − 67

(a) When a ratio of a width of a transform block divided by a height (nWidth/nHeight) is smaller than or equal to 2, and an index of an intra mode (predModeIntra) is greater than or equal to 2 and is smaller than or equal to 7 (nWidth/nHeight<=2 and 2<=predModeIntra<=7), an index of a modified intra prediction mode is set as a value obtained by adding 65 to an index of an intra prediction mode (predModeIntra=predModeIntra+65).

(b) When the ratio of the width of the transform block divided by the height (nWidth/nHeight) is greater than 2, and the index of the intra mode (predModeIntra) is greater than or equal to 2 and is smaller than or equal to 11 (nWidth/nHeight>2 and 2<=predModeIntra<=11), the index of the modified intra prediction mode is set as a value obtained by adding 65 to the index of the intra prediction mode (predModeIntra=predModeIntra+65).

(c) When the ratio of the height of the transform block divided by the width (nHeight/nWidth) is smaller than or equal to 2, and the index of the intra mode (predModeIntra) is greater than or equal to 61 and is smaller than or equal to 66 (nHeight/nWidth<=2 and 61<=predModeIntra<=66), the index of the modified intra prediction mode is set as a value obtained by subtracting 67 from the index of the intra prediction mode (predModeIntra=predModeIntra−67).

(d) When the ratio of the height of the transform block divided by the width (nHeight/nWidth) is greater than 2, and the index of the intra mode (predModeIntra) is greater than or equal to 57 and is smaller than or equal to 66 (nHeight/nWidth>2 and 57<=predModeIntra<=66), the index of the modified intra prediction mode is set as a value obtained by subtracting 67 from the index of the intra prediction mode (predModeIntra=predModeIntra−67).

That is, in (a) and (b) of Table 3, when the width of the transform block is greater than the height thereof, and the intra prediction mode is greater than or equal to 2 and is smaller than a first reference value, the value obtained by adding 65 to the intra prediction mode is determined as the modified intra prediction mode. In this case, when the ratio of the width of the transform block divided by the height is smaller than or equal to 2, the first reference value may be set to 8 (the case (a)), and when the ratio of the width of the transform block divided by the height is greater than 2, the first reference value may be set to 12 (the case (b)).

Furthermore, in (c) and (d) of Table 3, when the width of the transform block is smaller than the height thereof, and the intra prediction mode is greater than or equal to a second reference value and is smaller than or equal to 66, the value obtained by subtracting 67 from the intra prediction mode is determined as the modified intra prediction mode. In this case, when the ratio of the height of the transform block divided by the width is smaller than or equal to 2, the second reference value may be set to 61 (the case (c)), and when the ratio of the width of the transform block divided by the height is greater than 2, the second reference value may be set to 57 (the case (d)).

A case where the aforementioned wide angle intra prediction method may be advantageously applied is described with reference to FIGS. 24 and 25.

FIGS. 24 and 25 are embodiments to which the present disclosure is applied, and illustrate examples of an intra prediction for a non-square block.

If a width of a block is greater than a height thereof as illustrated in FIG. 24, in general, reference samples located on the upper side are closer to locations within the block to be predicted than reference samples located on the left. Accordingly, prediction performed in a bottom-left direction may be more accurate than prediction performed in a top-right direction. On the contrary, as illustrated in FIG. 25, if a height of a block is greater than a width thereof, in general, left reference samples are closer to locations within the block to be predicted than upper reference samples. Accordingly, prediction performed in a top-right direction may be more accurate than prediction performed in a bottom-left direction. Accordingly, transforming the index of the aforementioned intra prediction mode may be more advantageous. Intra prediction modes, that is, a target for a transform, may be summarized as in Table 4 and Table 5 with respect to the 35 mode and the 67 mode.

TABLE 4

| Condition | Replaced intra prediction modes |
|---|---|
| W/H == 2 | Modes 2, 3, 4 |
| W/H > 2 | Modes 2, 3, 4, 5, 6 |
| W/H == 1 | None |
| H/W == 1/2 | Modes 32, 33, 34 |
| H/W < 1/2 | Modes 30, 31, 32, 33, 34 |

TABLE 5

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Table 4 illustrates intra prediction modes to be transformed in the 35 mode configuration, and Table 5 illustrates intra prediction modes to be transformed in the 67 mode configuration. In Table 4 and Table 5, W indicates the width of a transform block, and H is the height of the transform block.

In an embodiment, the index of a wide angle intra prediction mode is coded before an index transform. That is, in the 67 mode configuration, although the No. 2 intra prediction mode is transformed in to the No. 67 intra prediction mode, 2, that is, an index of a previous mode, is coded.

FIG. 26 is an embodiment to which the present disclosure is applied, and illustrates an example of an order in which pixels are arranged when a two-dimensional block is changed into a one-dimensional vector, wherein FIG. 26a illustrates an example of a row-first order, and FIG. 26b illustrates an example of a column-first order.

As described above, if a wide angle intra prediction mode is applied, as illustrated in FIG. 22, a direction corresponding to the wide angle intra prediction mode is added in the existing an intra prediction. Prediction modes added on the lower side are represented as $ML_1$ to $ML_N$, and prediction modes added on the upper side are represented as $ML_1$ to $ML_N$. For example, a mode closest to the No. 2 mode is $ML_1$, and indices (1 to N) corresponding to respective prediction modes in the lower direction are increased (prediction mode values $ML_1$ to $ML_N$ are decreased), and the lowest mode is represented as $ML_N$. With respect to the 35 mode and the 67 mode, modes closest to the Nos. 34 and 66 are represented as $MT_1$, indices (1 to M) are increased to the right, and the rightmost mode is represented as $MT_M$.

With respect to the modes $ML_1$ to $ML_N$ and $ML_1$ to $ML_M$, a secondary transform set may be mapped as illustrated in FIG. 12. In FIG. 12, the same secondary transform set is applied with respect to a directional mode pair (e.g., Nos. 32 and 36) which is symmetrical to a diagonal direction (the No. 34 mode in the 67 mode configuration, and the No. 18 mode in the 35 mode configuration). The same or similar method may be applied to $ML_1$ to $ML_N$ and $MT_1$ to $MT_M$, that is, wide angle intra prediction modes. For example, if M=N and MLa and MTa are symmetrical to each other with respect to the diagonal direction (a=1, . . . , N), the same transform set may be applied to MLa and MTa.

In this case, with respect to the MTa mode, after two-dimensional input data is first transposed, a secondary transform is applied to MLa. That is, as illustrated in FIGS. 26a and 26b, if a transform is applied to MLa after the two-dimensional input data is transformed into one-dimensional input data by reading the two-dimensional input data in a row-first (or column-first) direction, the same transform as that of MLa is applied to MTa after input data is transformed into one-dimensional data by reading the input data in the column-first (or row-first) direction. A number indicated in each location in FIGS. 26a and 26b indicates an index for indicating a pixel location not a pixel value.

FIG. 27 is an embodiment to which the present disclosure is applied, and illustrates an example of a mapping table between 35 transform sets and an intra prediction mode, wherein FIG. 27a illustrates an example of a case where a transform set is symmetrically assigned to each wide angle mode, FIG. 27b illustrates an example of a case where a No. 2 transform set is assigned to all wide angle modes, and FIG. 27c illustrates an example of a case where the same additional transform set is assigned to all wide angle modes.

In FIG. 27a, the same transform set indices as those of FIG. 12 may be assigned to Nos. 0 to 66 modes. Different indices of additional transform sets may be assigned to mode pairs corresponding to wide angle modes (wherein the mode pair corresponds to (MLa, MTa), a=1, 2, . . . , 10), respectively.

Furthermore, as illustrated in FIG. 27b, a transform set index No. 2 index may be reused for additional wide angle modes. As in FIG. 27c, a separate transform set index No. 35 may be assigned to additional wide angle modes.

FIG. 28 is an embodiment to which the present disclosure is applied, and illustrates an example of a mapping table between 10 transform sets and an intra prediction mode, wherein FIG. 28a illustrates an example of a case where a No. 2 transform set is assigned to each wide angle mode, and FIG. 28b illustrates an example of a case where the same additional transform set is assigned to all wide angle modes.

10 transform sets may be mapped to Nos. 0 to 66 intra prediction modes as illustrated in FIGS. 28a and 28b. An index shown in FIGS. 28a and 28b is for distinguishing between transform sets. The same index as that of FIGS. 27a to 27c may correspond to the same transform set and may correspond to a different transform set.

A No. 2 transform set may be reused for additional wide angle intra prediction modes as illustrated in FIG. 28a, and a No. 35 transform set may be assigned as a separate transform set as illustrated in FIG. 28b.

FIG. 29 is an embodiment to which the present disclosure is applied, and illustrates an example of a mapping table between six transform sets and an intra prediction mode, wherein FIG. 29a illustrates an example of a case where a No. 2 transform set is assigned to each wide angle mode, and FIG. 29b illustrates an example of a case where the same additional transform set is assigned to all wide angle modes.

Six transform sets may be mapped to Nos. 0 to 66 intra prediction modes as illustrated in FIGS. 29a and 29b. Indices shown in FIGS. 29a and 29b are for distinguishing between transform sets. The same indices as those of FIGS. 27a to 28b may correspond to the same transform sets or the indices may correspond to different transform sets.

The No. 2 transform set may be reused for additional wide angle intra prediction modes as illustrated in FIG. 29a, and a No. 35 transform set may be assigned to additional wide angle intra prediction modes as illustrated in FIG. 29b.

FIG. 30 is an embodiment to which the present disclosure is applied, and illustrates an example of a mapping table between four transform sets and an intra prediction mode, wherein FIG. 30a illustrates an example of a case where a No. 2 transform set is assigned to each wide angle mode, and FIG. 30b illustrates an example of a case where the same additional transform set is assigned to all wide angle modes.

Four transform sets may be mapped to Nos. 0 to 66 intra prediction modes as illustrated in FIGS. 30a and 30b. Indices shown in FIGS. 30a and 30b are for distinguishing between transform sets. The same indices as those of FIGS. 27a to 28b may correspond to the same transform sets or the indices may correspond to different transform sets.

The No. 2 transform set may be reused for additional wide angle intra prediction modes as illustrated in FIG. 30a, and a No. 35 transform set may be assigned to additional wide angle intra prediction modes as illustrated in FIG. 30b.

That is, as illustrated in FIG. 30a, when a modified intra prediction mode is greater than or equal to 0 and smaller than or equal to 1 due to the application of a wide angle intra prediction mode, the index of a non-separable secondary transform set may be determined as a first index value 0. When the modified intra prediction mode is greater than or equal to 2 and smaller than or equal to 12, the index of the non-separable secondary transform set may be determined as a second index value 2. When the modified intra prediction mode is greater than or equal to 13 and smaller than or equal to 23, the index of the non-separable secondary transform set may be determined as a third index value 18. When the modified intra prediction mode is greater than or equal to 24 and smaller than or equal to 44, the index of the non-separable secondary transform set may be determined as a fourth index value 34. When the modified intra prediction mode is greater than or equal to 45 and smaller than or equal to 55, the index of the non-separable secondary transform set may be determined as the third index value 18. When the modified intra prediction mode is greater than or equal to 56, the index of the non-separable secondary transform set may be determined as the second index value 2. When the modified intra prediction mode is smaller than 0, the index of the non-separable secondary transform set may be determined as the second index value 2.

FIG. 31 is an embodiment to which the present disclosure is applied, and illustrates an example of a flowchart in which the encoder performs a transform by considering wide angle intra prediction (WAIP). FIG. 31 illustrates an example of an operation by the encoder 100. FIG. 31 illustrates an example of a secondary transform step performed prior to a quantization step after a prediction step and a primary transform step on the basis of the encoder 100.

The encoder 100 may determine an intra prediction mode by considering WAIP (S3110). According to an embodiment of the present disclosure, as illustrated in FIG. 24 or 25, in order to generate a more accurate prediction sample for a non-square prediction unit, WAIP may be applied. If WAIP is applied, as in Tables 2 to 5, a modified intra prediction mode may be used instead of a specific intra prediction mode.

Furthermore, the encoder 100 codes an index corresponding to an applied intra prediction mode (S1350). In this case, the encoder 100 may code the original intra prediction mode prior to the change of the index. For example, in the 67 mode configuration, although a No. 2 intra prediction mode is transformed into a No. 67 intra prediction mode, 2, that is, the index of a previous intra prediction mode, is coded.

The encoder 100 determines a secondary transform set using a pre-configured map (S3120). In this case, the pre-configured map may be the index mapping table shown in FIGS. 27a to 30b.

Thereafter, the encoder 100 may select the best secondary transform through a rate-distortion cost comparison after a primary transform is applied (S3130), and may code an index for the selected secondary transform (S3140). According to an embodiment of the present disclosure, the secondary transform may be a non-separable transform applied to a top left region (low frequency domain) of a transform block after the primary transform is applied. With respect to the transform block to which the secondary transform has been applied, the encoder 100 may output a bit stream through quantization and entropy coding. The encoder 100 may apply the primary transform to a transform block from which prediction samples have been excluded from a coding unit prior to the secondary transform. In this case, the primary transform may correspond to a separable transform for a row direction and column direction.

FIG. 32 is an embodiment to which the present disclosure is applied, and illustrates an example of a flowchart in which the decoder performs a transform by considering WAIP. FIG. 32 illustrates an example of an operation by the decoder 200. FIG. 32 illustrates an example of an inverse secondary transform step performed prior to an inverse primary transform step after an inverse quantization step on the basis of the decoder 200.

The decoder 200 parses, from an image signal, the index of an intra prediction mode for a transform block on which entropy decoding and inverse quantization have been performed (S3210). Furthermore, the decoder 200 parses the index of a secondary transform from a bit stream related to the image signal. In this case, the index of the intra prediction mode and the index of the secondary transform, together with the image signal, may be transmitted by the encoder 100.

The decoder 200 determines an intra prediction mode by considering WAIP (S3220). According to an embodiment of the present disclosure, as illustrated in FIG. 24 or 25, WAIP may be applied in order to generate a more accurate prediction sample for a non-square prediction unit. If WAIP is applied, as in Tables 2 to 5, a modified intra prediction mode may be used instead of a specific intra prediction mode. Furthermore, the index of the intra prediction mode received from the encoder 100 may be the original index of the intra prediction mode prior to a change, not an index changed by the application of WAIP. In this case, the decoder 200 may determine the index of a modified intra prediction mode after a transform is performed on the original index with reference to Tables 2 to 5.

The decoder 200 selects a secondary transform set from a predetermined map (S3230). In this case, the pre-configured map may be the index mapping table shown in FIGS. 27a to 30b.

The decoder 200 selects a secondary transform from the selected secondary transform set (S3240), and applies an inverse secondary transform to a transform block (S3250). In this case, the secondary transform may be a non-separable transform applied to a top left region (low frequency domain) of the transform block after the primary transform is applied. Thereafter, the decoder 200 may generate a residual sample by applying an inverse primary transform to the transform block to which the inverse secondary transform has been applied. In this case, the inverse primary transform may correspond to a separable transform in a row direction and column direction.

FIG. 33 is an embodiment to which the present disclosure is applied, and illustrates another example of a flowchart in which the decoder performs a transform by considering WAIP.

A method of decoding an image signal according to an embodiment of the present disclosure may include the step S3310 of determining a modified intra prediction mode of a current block having a different width and height from an intra prediction mode based on a ratio between the width and height of the current block and an intra prediction mode, the step S3320 of determining an inverse non-separable transform set based on the modified intra prediction mode, and the step S3330 of applying an inverse non-separable transform matrix, selected from the inverse non-separable transform set, to a top-left region of the current block determined based on the width and height of the current block.

More specifically, first, the decoder 200 may generate a block (current block) composed of coefficients of a frequency domain through entropy decoding and inverse quantization with respect to a bit stream of an image signal generated by the encoder 100.

In step S3310, if the current block is a non-square (the width and height of the current block are different), the decoder 200 may determine a modified intra prediction mode by considering a condition for the width and height of the current block and a condition for the range of a coded intra prediction mode. A transform between the index of the coded intra prediction mode and the modified intra prediction mode may be configured like Tables 2 to 4.

For example, in Table 3, that is, in (a) and (b) of Table 3, when the width of a transform block is greater than the height thereof, and an intra prediction mode is greater than or equal to 2 and is smaller than a first reference value, a value obtained by adding 65 to the intra prediction mode is determined as a modified intra prediction mode. In this case, when a ratio of the width of the current block divided by a height thereof is smaller than or equal to 2, the first reference value is set to 8 (the case (a)). When the ratio of the width of the transform block divided by the height is greater than 2, the first reference value may be set to 12 (the case (b)). Furthermore, in (c) and (d) of Table 3, when the width of the transform block is smaller than the height thereof, and the intra prediction mode is greater than or equal to a second reference value and is smaller than or equal to 66, a value obtained by subtracting 67 from the intra prediction mode is determined as the modified intra prediction mode. In this case, when the ratio of the height of the transform block divided by the width is smaller than or equal to 2, the second reference value may be set to 61 (the case (c)). When the ratio of the width of the transform block divided by the height is greater than 2, the second reference value may be set to 57 (the case (d)).

In step S3320, the decoder 200 determines an inverse non-separable transform set based on the modified intra prediction mode. According to an embodiment of the present disclosure, the decoder 200 may determine the index of a low frequency non-separable transform matrix set corresponding to the modified intra prediction mode. Mapping between the index of the modified intra prediction mode and the inverse non-separable transform may be configured as illustrated in FIGS. 27a to 30b by considering WAIP.

For example, as illustrated in FIG. 30a, when a modified intra prediction mode is greater than or equal to 0 and smaller than or equal to 1 due to the application of a wide angle intra prediction mode, the index of a non-separable secondary transform set may be determined as a first index value 0. When the modified intra prediction mode is greater than or equal to 2 and smaller than or equal to 12, the index of the non-separable secondary transform set may be determined as a second index value 2. When the modified intra prediction mode is greater than or equal to 13 and smaller than or equal to 23, the index of the non-separable secondary transform set may be determined as a third index value 18. When the modified intra prediction mode is greater than or equal to 24 and smaller than or equal to 44, the index of the non-separable secondary transform set may be determined as a fourth index value 34.

When the modified intra prediction mode is greater than or equal to 45 and smaller than or equal to 55, the index of the non-separable secondary transform set may be determined as the third index value 18. When the modified intra prediction mode is greater than or equal to 56, the index of the non-separable secondary transform set may be determined as the second index value 2. When the modified intra prediction mode is smaller than 0, the index of the non-separable secondary transform set may be determined as the second index value 2.

In step S3330, the decoder 200 may apply, to the current block, an inverse non-separable transform matrix selected from the inverse non-separable transform set determined in step S3320. For example, the decoder 200 may apply, to the current block, an inverse non-separable transform matrix designated by an index from the inverse non-separable transform set determined in step S3320. Thereafter, the decoder 200 may generate a residual signal or a residual block by applying an additional transform (or an inverse primary transform).

FIG. 34 is an embodiment to which the present disclosure is applied, and illustrates an example of a block diagram of an image processing apparatus. The image processing apparatus may correspond to the decoding apparatus or the encoding apparatus.

The image processing apparatus 3400 that processes an image signal includes a memory 3420 that stores an image signal and a processor 3410 coupled to the memory and processing an image signal.

The processor 3410 according to an embodiment of the present disclosure may be composed of at least one processing circuit for the processing of an image signal, and may process an image signal by executing instructions for encoding or decoding the image signal. That is, the processor 3410 may encode the original image data or decode an encoded image signal by executing the aforementioned encoding or decoding methods.

FIG. 35 illustrates an example of an image coding system in an embodiment to which the present disclosure is applied.

The image coding system may include a source device and a receiving device. The source device may transmit an encoding video/image information or data to the receiving device in a file or streaming form through a digital storage medium or over a network.

The source device may include an image source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be implemented as a separate device or an external component.

The image source may acquire a video/image through a capturing, synthesizing, or generating process of the video/image. The image source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated by the computer, etc., and in this case, the video/image capturing process may be replaced by a process of generating related data.

The encoding apparatus may encode an input video/image. The encoding apparatus may perform a series of procedures including prediction, transform, quantization, and the like for compression and coding efficiency. The encoded data (encoded video/image information) may be output in the bit stream form.

The transmitter may transfer the encoded video/image information or data output in the bit stream to the receiver of the receiving device through the digital storage medium or network in the file or streaming form. The digital storage medium may include various storage media such as USB, SD, CD, DVD, Blu-ray, HDD, SSD, and the like. The transmitter may include an element for generating a media file through a predetermined file format and may include an element for transmission through a broadcast/communication network. The receiver may extract the bit stream and transfer the extracted bit stream to the decoding apparatus.

The decoding apparatus may perform a series of procedures including dequantization, inverse transform, prediction, etc., corresponding to an operation of the encoding apparatus to decode the video/image.

The renderer may render the decoded video/image. The rendered video/image may be displayed by the display.

FIG. 36 illustrates an example of an image streaming system as an embodiment to which the present disclosure is applied.

Referring to FIG. 36, the content streaming system to which the present disclosure is applied may basically include an encoding server, a streaming server, a web server, a media storage, a user equipment and a multimedia input device.

The encoding server basically functions to generate a bit stream by compressing content input from multimedia input devices, such as a smartphone, a camera or a camcorder, into digital data, and to transmit the bit stream to the streaming server. For another example, if multimedia input devices, such as a smartphone, a camera or a camcorder, directly generate a bit stream, the encoding server may be omitted.

The bit stream may be generated by an encoding method or bit stream generation method to which the present disclosure is applied. The streaming server may temporally store a bit stream in a process of transmitting or receiving the bit stream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bit stream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

The embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which the present disclosure may be included in a multimedia broadcasting transmitting and receiving device, a mobile communication terminal, a home cinema video device, a digital cinema video device, a surveillance camera, an image chat device, a real time communication device such as image communication, a mobile streaming device, storage media, a camcorder, an image on demand (VoD) service providing device, an OTT (Over the top) image device, an Internet streaming service providing devices, a three-dimensional (3D) image device, an image telephone image device, a transportation means terminal (e.g., a vehicle terminal, an airplane terminal, a ship terminal, etc.), and a medical image device, etc., and may be used to process an image signal or a data signal. For example, the OTT image device may include a game console, a Blu-ray player, an Internet access TV, a home theater system, a smartphone, a tablet PC, a digital image recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bit stream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

As described above, the embodiments described in the present disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the present disclosure is applied may be included in a multimedia broadcasting transmission and reception device, a mobile communication terminal, a home cinema video device, a digital cinema video device, a camera for monitoring, an image dialogue device, a real-time communication device such as image communication, a mobile streaming device, a storage medium, a camcorder, an image on-demand (VoD) service provision device, an over the top (OTT) image device, an Internet streaming service provision device, a three-dimensional (3D) image device, an image telephony device, and a medical image device, and may be used to process an image signal or a data signal. For example, the OTT image device may include a game console, a Blu-ray player, Internet access TV, a home theater system, a smartphone, a tablet PC, and a digital image recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices in which computer-readable data is stored. The computer-readable recording medium may include a bluray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the present disclosure may be implemented as a computer program product using program code. The program code may be performed by a computer according to an embodiment of the present disclosure. The program code may be stored on a carrier readable by a computer.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute an embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The aforementioned preferred embodiments of the present disclosure have been disclosed for illustrative purposes, and those skilled in the art may improve, change, substitute, or add various other embodiments without departing from the technical spirit and scope of the present disclosure disclosed in the attached claims.

The invention claimed is:

1. A method for decoding an image signal by an apparatus, comprising:
   determining a modified intra prediction mode of a current block having a different width and height from an intra prediction mode, based on a ratio between the width and height of the current block and the intra prediction mode;
   determining an inverse non-separable transform set based on the modified intra prediction mode; and
   applying an inverse non-separable transform matrix selected from the inverse non-separable transform set, to a top-left region of the current block determined based on the width and height of the current block,
   wherein determining the inverse non-separable transform set comprises determining an index of the inverse non-separable transform set related to the modified intra prediction mode,
   wherein based on that the modified intra prediction mode is greater than or equal to 0 and smaller than or equal to 1, the index is determined as a first index value,
   wherein based on that the modified intra prediction mode is greater than or equal to 2 and smaller than or equal to 12, the index is determined as a second index value,
   wherein based on that the modified intra prediction mode is greater than or equal to 13 and smaller than or equal to 23, the index is determined as a third index value,
   wherein based on that the modified intra prediction mode is greater than or equal to 24 and smaller than or equal to 44, the index is determined as a fourth index value,
   wherein based on that the modified intra prediction mode is greater than or equal to 45 and smaller than or equal to 55, the index is determined as the third index value,
   wherein based on that the modified intra prediction mode is greater than or equal to 56, the index is determined as the second index value, and
   wherein based on that the modified intra prediction mode is smaller than 0, the index is determined as the second index value.

2. The method of claim 1,
   wherein determining the modified intra prediction mode comprises determining, as the modified intra prediction mode, a value obtained by adding 65 to the intra prediction mode based on that the width is greater than the height, and the intra prediction mode is greater than or equal to 2 and is smaller than a first reference value.

3. The method of claim 2,
   wherein based on that a ratio of the width divided by the height is smaller than or equal to 2, the first reference value is set to 8, and
   wherein based on that the ratio of the width divided by the height is greater than 2, the first reference value is set to 12.

4. The method of claim 1,
   wherein determining the modified intra prediction mode comprises determining, as the modified intra prediction mode, a value obtained by subtracting 67 from the intra prediction mode based on that the width is smaller than the height, and the intra prediction mode is greater than a second reference value and is smaller than or equal to 66.

5. The method of claim 4,
   wherein based on that the ratio is smaller than or equal to 2, the second reference value is set to 61, and
   wherein based on that the ratio is greater than 2, the second reference value is set to 57.

6. A method for encoding an image signal by an apparatus, comprising:
   determining a modified intra prediction mode of a current block having a different width and height from an intra prediction mode, based on a ratio between the width and height of the current block and the intra prediction mode;
   determining a non-separable transform set based on the modified intra prediction mode; and
   applying a non-separable transform matrix selected from the non-separable transform set, to a top-left region of the current block determined based on the width and height of the current block,
   wherein determining the non-separable transform set comprises determining an index of the non-separable transform set related to the modified intra prediction mode,
   wherein based on that the modified intra prediction mode is greater than or equal to 0 and smaller than or equal to 1, the index is determined as a first index value,
   wherein based on that the modified intra prediction mode is greater than or equal to 2 and smaller than or equal to 12, the index is determined as a second index value,
   wherein based on that the modified intra prediction mode is greater than or equal to 13 and smaller than or equal to 23, the index is determined as a third index value, wherein based on that the modified intra prediction mode is greater than or equal to 24 and smaller than or equal to 44, the index is determined as a fourth index value, wherein based on that the modified intra prediction mode is greater than or equal to 45 and smaller than or equal to 55, the index is determined as the third index value, wherein based on that the modified intra prediction mode is greater than or equal to 56, the index is determined as the second index value, and wherein based on that the modified intra prediction mode is smaller than 0, the index is determined as the second index value.

7. A non-transitory computer-readable medium storing a bitstream causing an image decoding apparatus to perform an image decoding method, the image decoding method comprising:

determining a modified intra prediction mode of a current block having a different width and height from an intra prediction mode, based on a ratio between the width and height of the current block and the intra prediction mode;

determining an inverse non-separable transform set based on the modified intra prediction mode; and applying an inverse non-separable transform matrix selected from the inverse non-separable transform set, to a top-left region of the current block determined based on the width and height of the current block, wherein determining the inverse non-separable transform set comprises determining an index of the inverse non-separable transform set related to the modified intra prediction mode, wherein based on that the modified intra prediction mode is greater than or equal to 0 and smaller than or equal to 1, the index is determined as a first index value, wherein based on that the modified intra prediction mode is greater than or equal to 2 and smaller than or equal to 12, the index is determined as a second index value, wherein based on that the modified intra prediction mode is greater than or equal to 13 and smaller than or equal to 23, the index is determined as a third index value, wherein based on that the modified intra prediction mode is greater than or equal to 24 and smaller than or equal to 44, the index is determined as a fourth index value, wherein based on that the modified intra prediction mode is greater than or equal to 45 and smaller than or equal to 55, the index is determined as the third index value, wherein based on that the modified intra prediction mode is greater than or equal to 56, the index is determined as the second index value, and wherein based on that the modified intra prediction mode is smaller than 0, the index is determined as the second index value.

* * * * *